(12) United States Patent
Naruse et al.

(10) Patent No.: US 6,526,480 B1
(45) Date of Patent: Feb. 25, 2003

(54) CACHE APPARATUS AND CONTROL METHOD ALLOWING SPECULATIVE PROCESSING OF DATA

(75) Inventors: Akira Naruse, Kawasaki (JP); Kouichi Kumon, Kawasaki (JP); Mitsuru Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/646,704

(22) PCT Filed: Dec. 10, 1998

(86) PCT No.: PCT/JP98/05588

§ 371 (c)(1),
(2), (4) Date: Sep. 21, 2000

(87) PCT Pub. No.: WO00/34882

PCT Pub. Date: Jun. 15, 2000

(51) Int. Cl.[7] .............................................. G06F 12/00
(52) U.S. Cl. ....................................... 711/144; 711/141
(58) Field of Search ................................ 711/141, 144, 711/146, 145, 147, 130

(56) References Cited

U.S. PATENT DOCUMENTS 6,374,330 B1 * 4/2002 Arimilli et al. ............. 711/141

FOREIGN PATENT DOCUMENTS

| JP | 3-502382 A | 5/1991 |
| JP | 8-328957 A | 12/1996 |
| JP | 9-050400 A | 2/1997 |

OTHER PUBLICATIONS

Anjo, Ken-ichiro, et al., "MBP-light: DSM Management Processor on Massively Parallel Processor JUMP-1," Jouhou Shori Gakkai Rombunshi, Jun. 1998, vol. 39, No. 6, pp. 1632–1643.

* cited by examiner

*Primary Examiner*—Do Hyun Yoo
*Assistant Examiner*—Kimberly N. McLean-Mayo
(74) *Attorney, Agent, or Firm*—Staas & Halsely LLP

(57) ABSTRACT

The invention relates to cache apparatuses and a control method for managing cache memories in a multiprocessor system. A cache controller holds data which has to be invalidated for a cache coherence as data in a status where the validity is unknown, causes a cache hit in response to a reading request from a processor, provides the data as speculation data, and allows the processor to speculatively process the data. Therefore, since the data which has to be obtained from another cache or a main storage due to the invalidation is held in an Unknown status, a cache hit occurs. Thus, a data waiting time of the processor can be shortened.

26 Claims, 27 Drawing Sheets

READ

WRITE

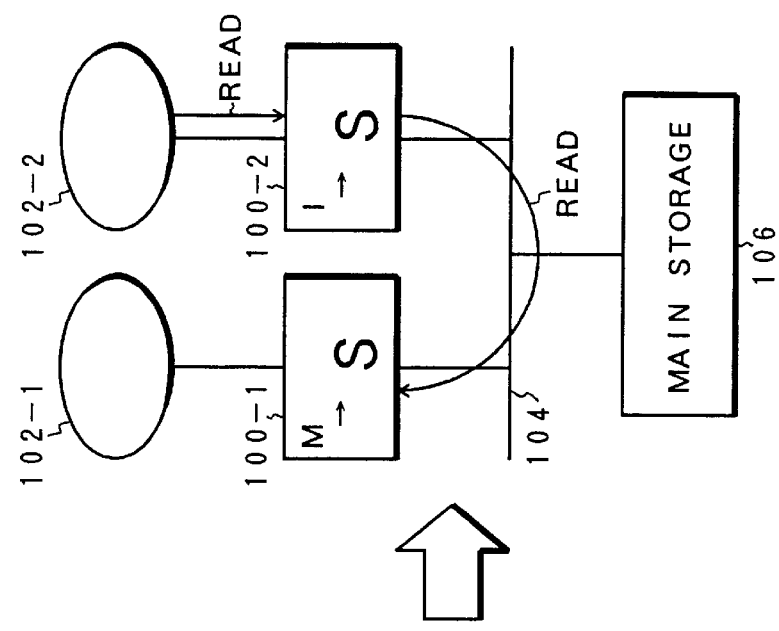
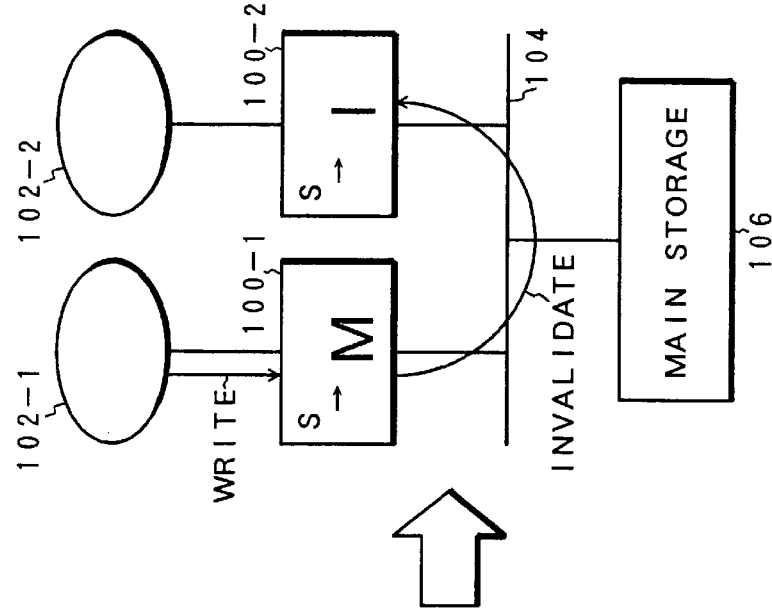
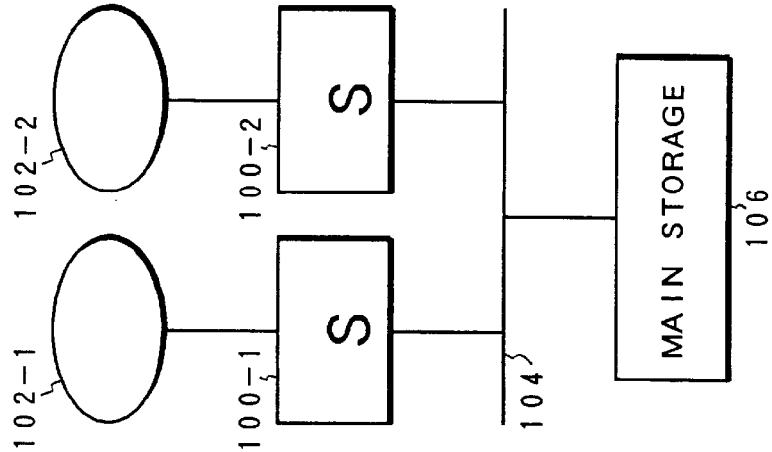

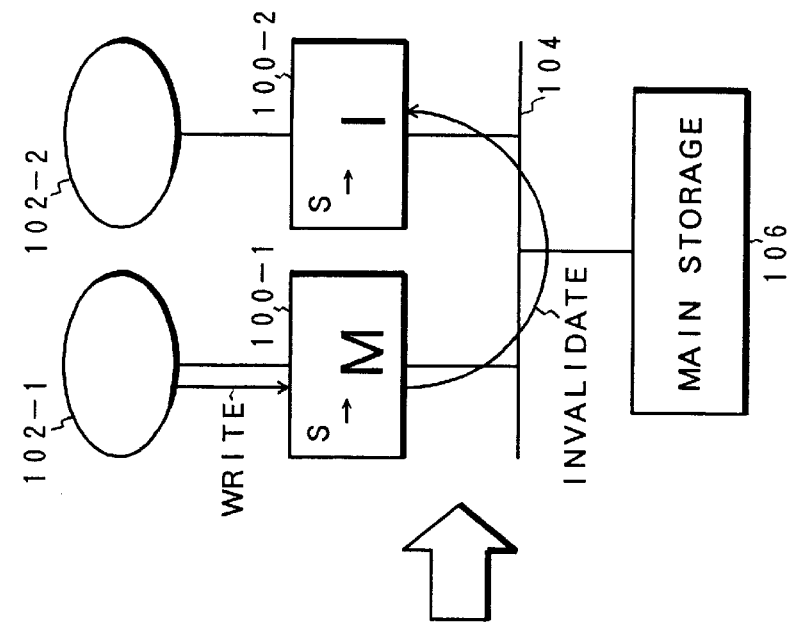
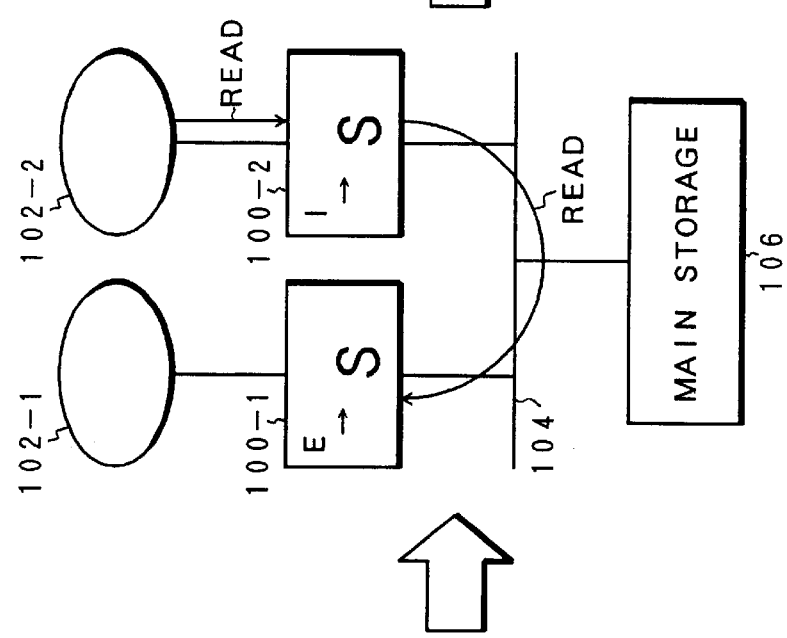
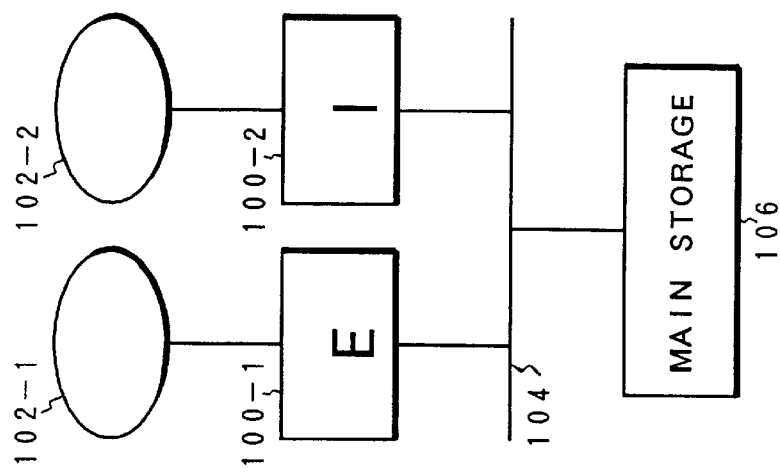

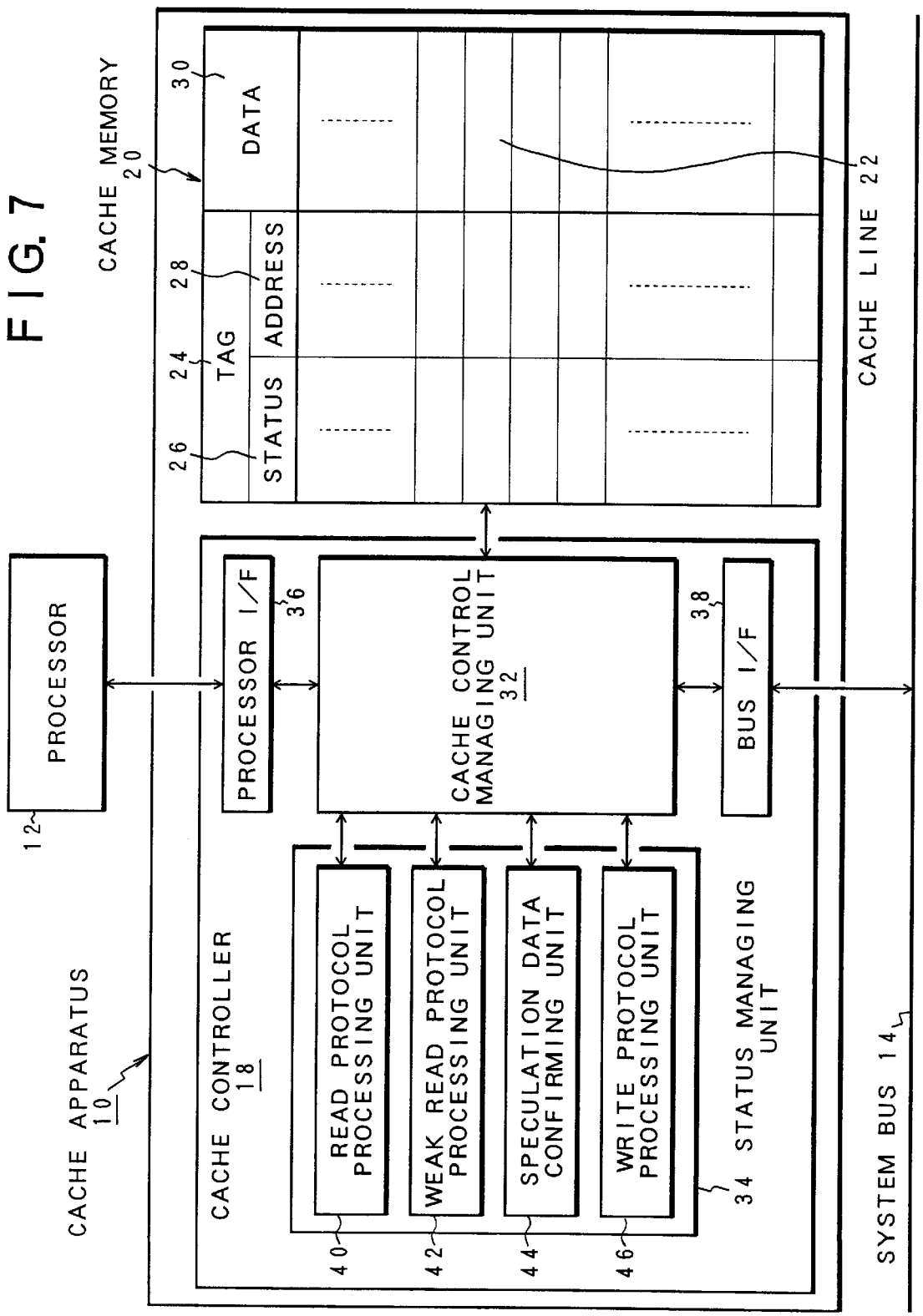

WRITE

WEAK-READ

FIG. 9

STATUS TRANSITION TABLE (MESIU PROTOCOL)

| CURRENT STATUS | NEXT STATUS | | | | | |
|---|---|---|---|---|---|---|
| | SELF | | | OTHER | | |
| | READ | WRITE | WEAK-READ | READ | WRITE | WEAK-READ |
| MODIFIED (M) | M | M | M | S | U | E |
| EXCLUSIVE (E) | E | M | E | S | U | E |
| SHARED (S) | S | M | S | S | U | S |
| INVALID (I) | E,S | M | E,U | – | – | – |
| UNKNOWN (U) | E,S | M | U | U | U | U |

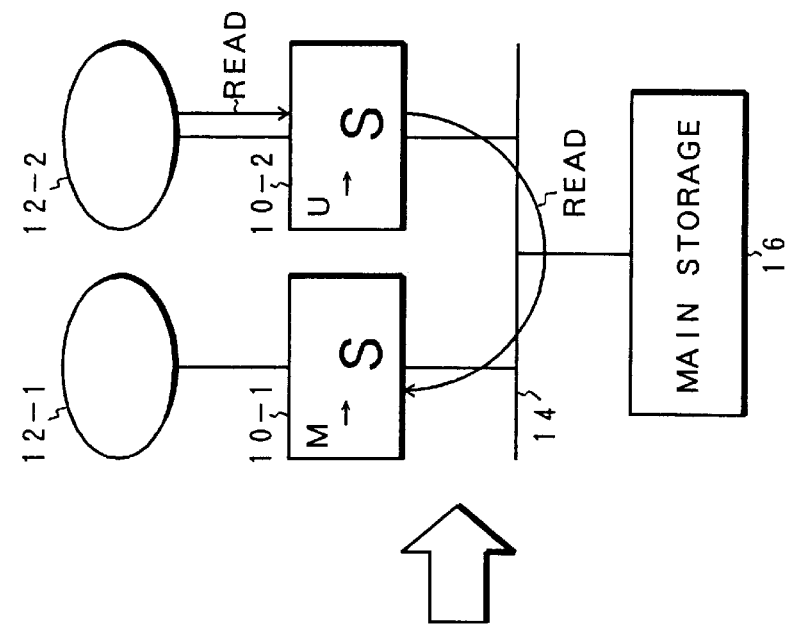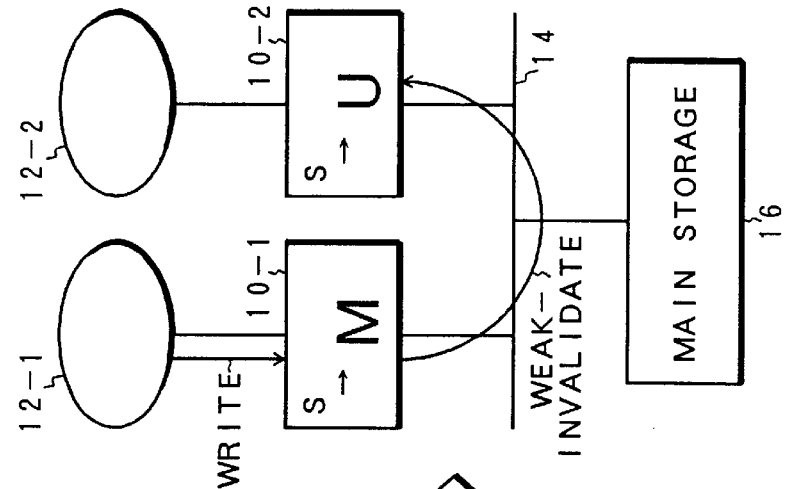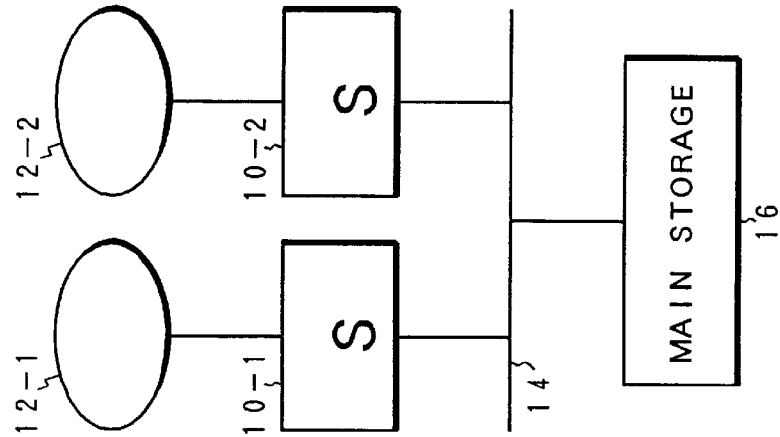

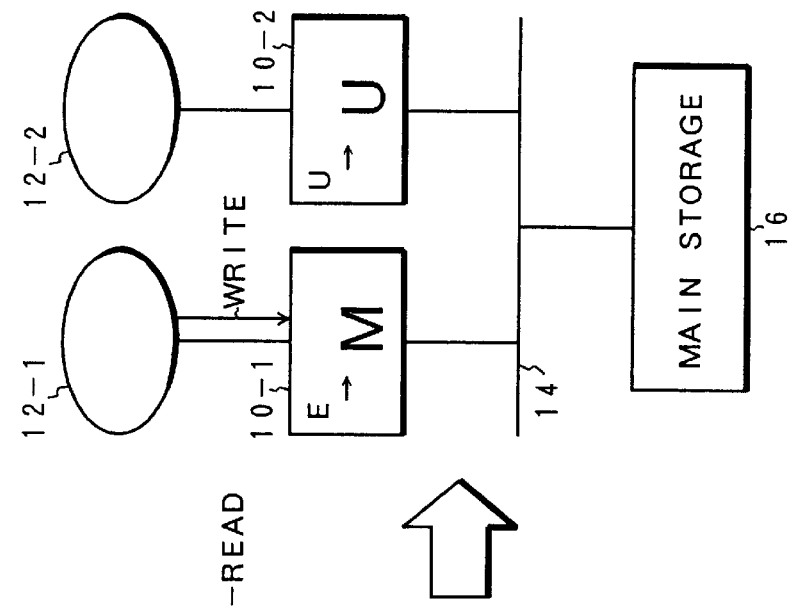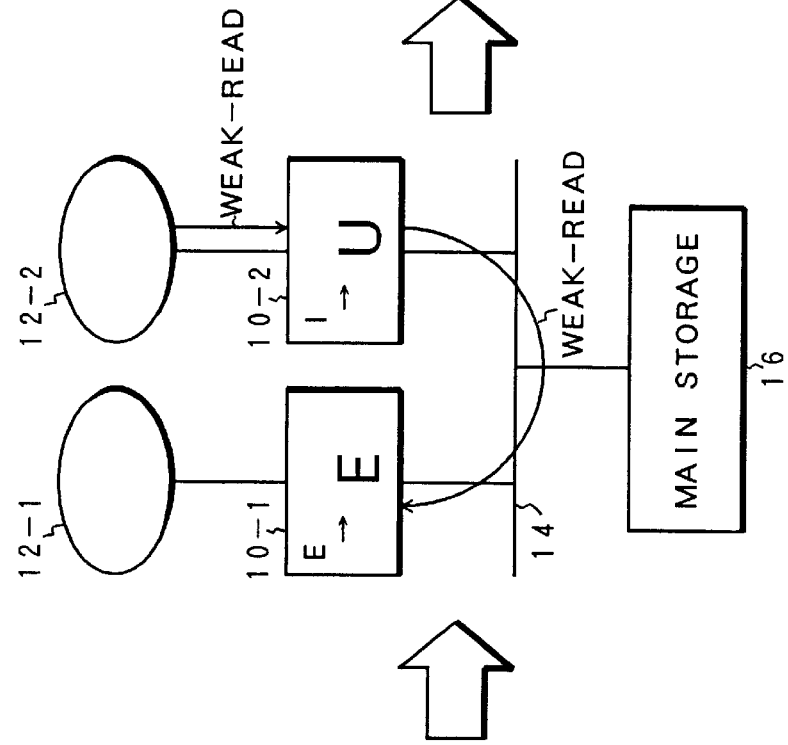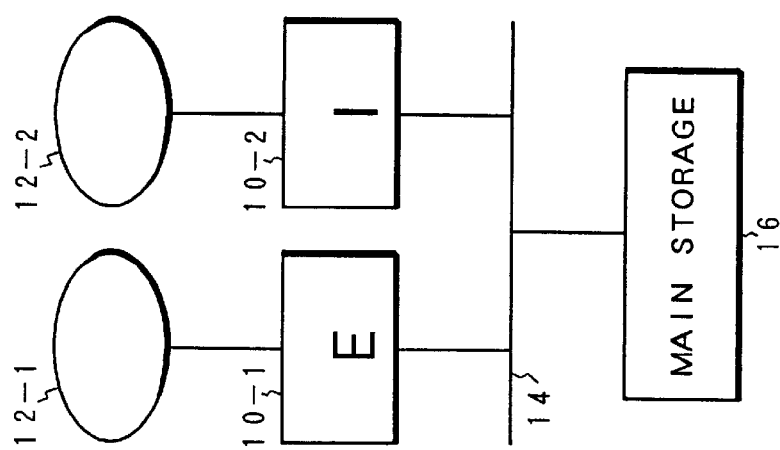

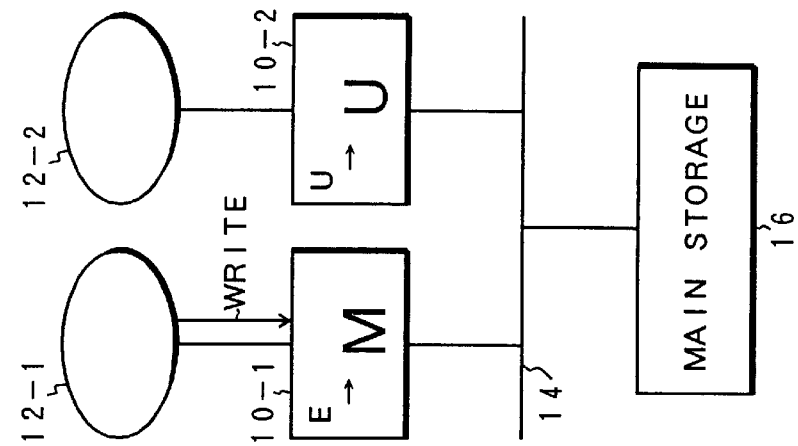
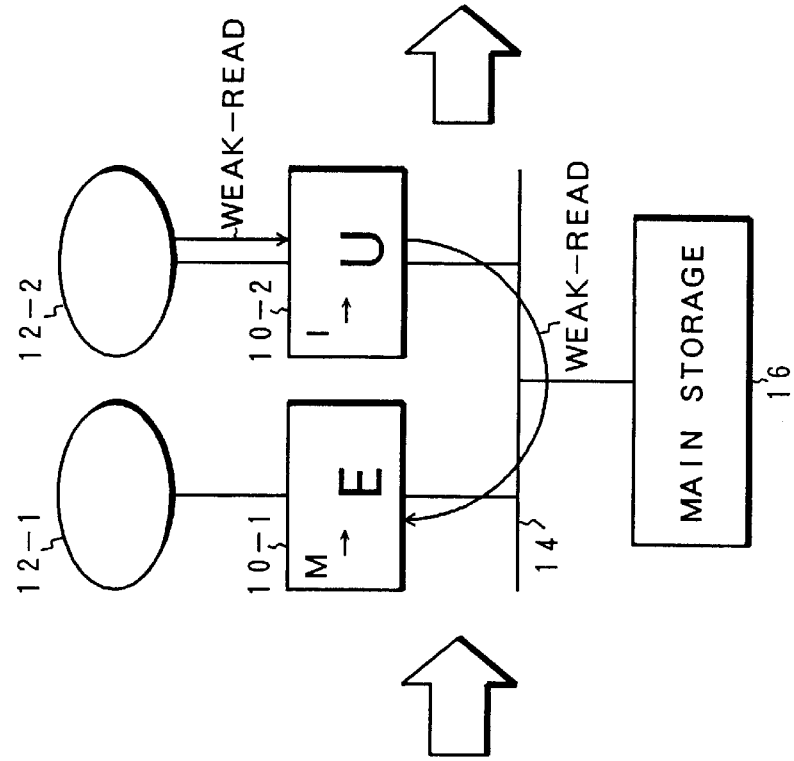
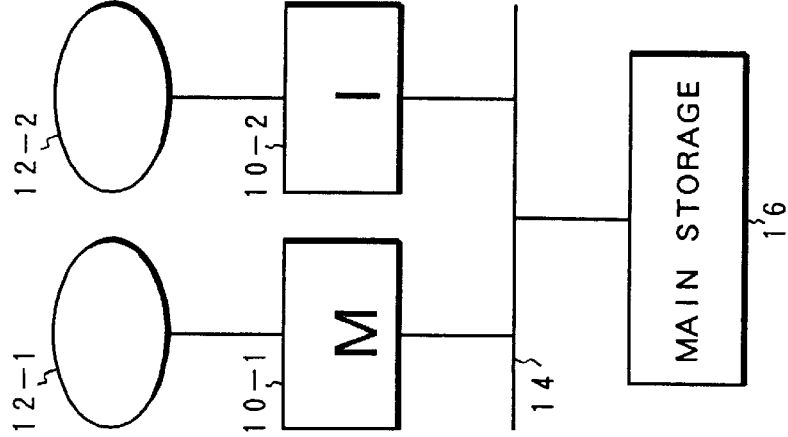

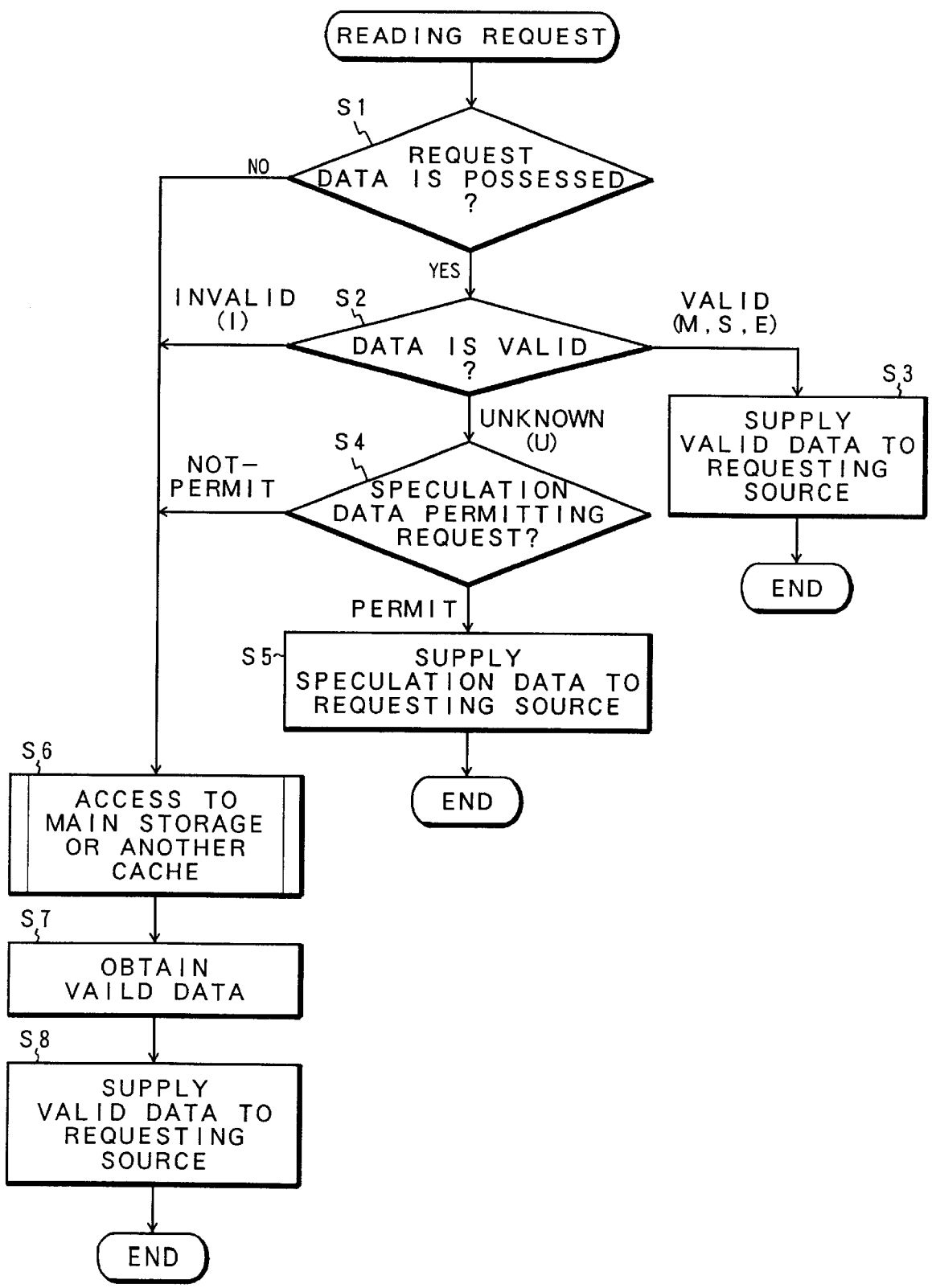

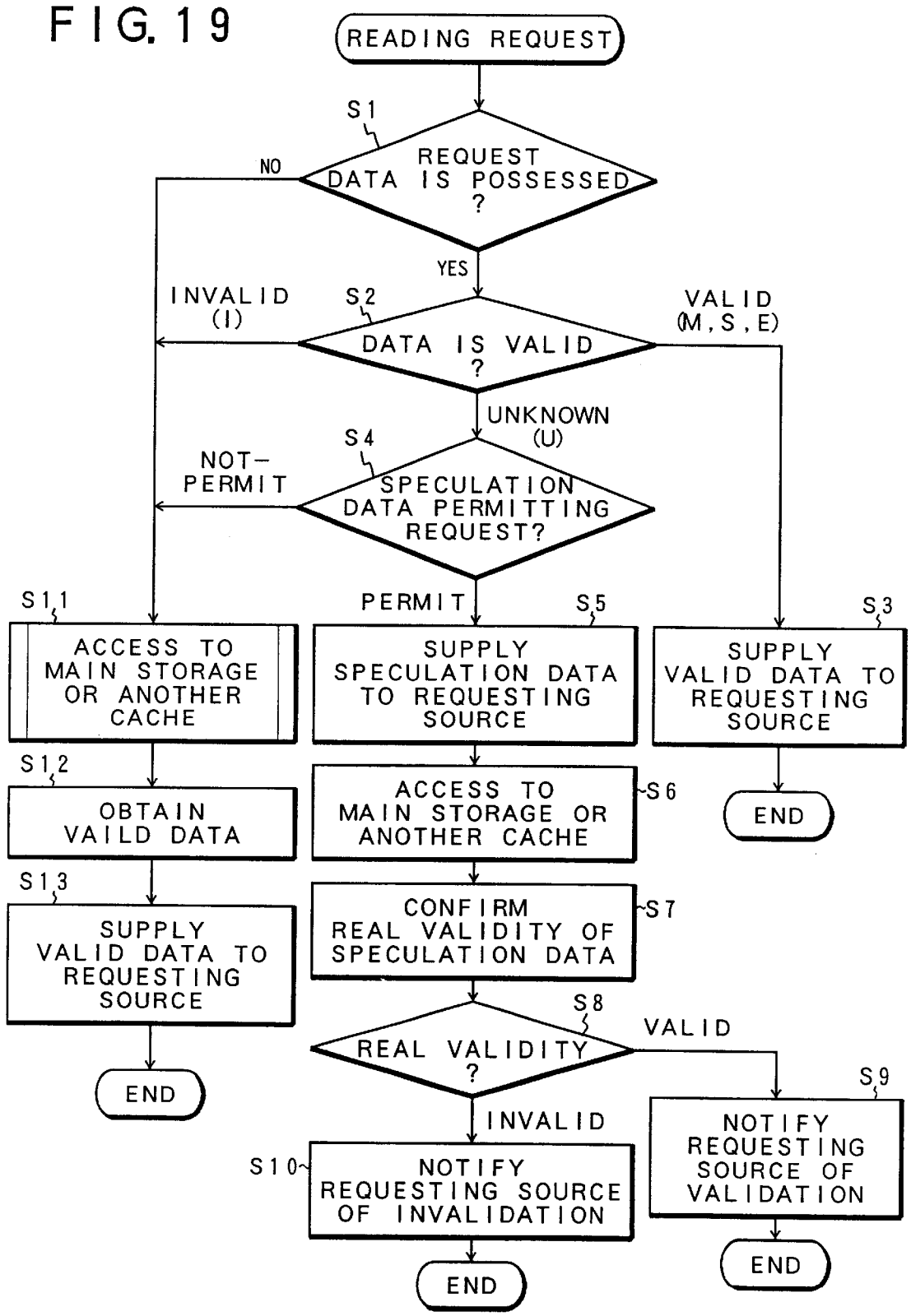
F I G. 19

READ

WRITE

WEAK-READ

FIG. 21

STATUS TRANSITION TABLE (MESU PROTOCOL)

| CURRENT STATUS | NEXT STATUS | | | | | | |
|---|---|---|---|---|---|---|---|
| | SELF | | | OTHER | | | |
| | READ | WRITE | WEAK-READ | READ | WRITE | WEAK-READ | |
| MODIFIED (M) | M | M | M | S | U | E | |
| EXCLUSIVE (E) | E | M | E | S | U | E | |
| SHARED (S) | S | M | S | S | U | S | |
| UNKNOWN (U) | E,S | M | E,U | U | U | U | |

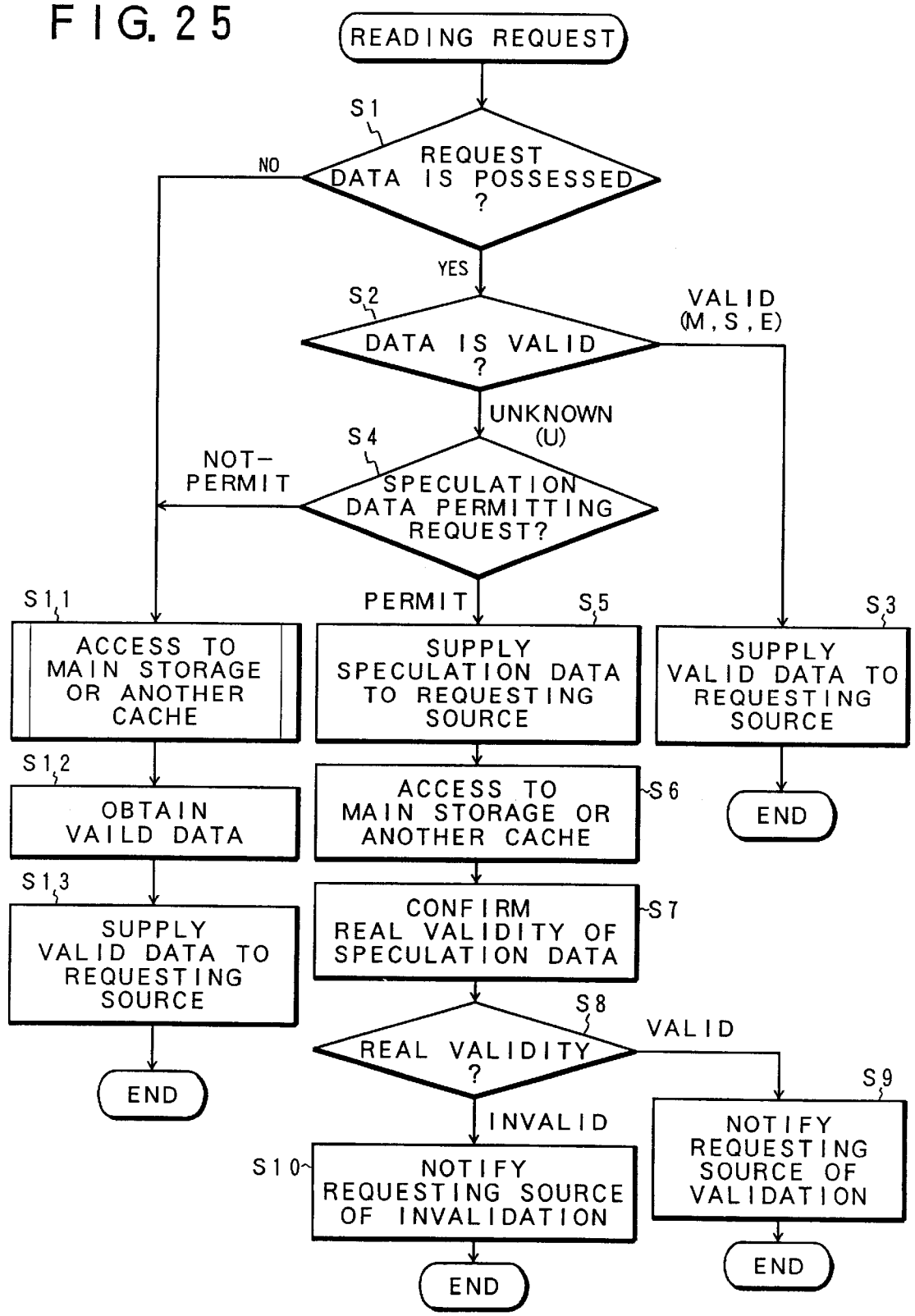

CACHE APPARATUS AND CONTROL METHOD ALLOWING SPECULATIVE PROCESSING OF DATA

TECHNICAL FIELD

The present invention relates to a cache apparatus and a control method for managing a cache memory by a multiprocessor system and, more particularly, to a cache apparatus and a control method for enabling a cache memory to hold data whose validity is uncertain and allowing a processor to speculatively process the data.

BACKGROUND ART

Generally, an access time to a main storage of a computer system is extremely slower as compared with an operating speed of a processor. When an access to the main storage occurs, therefore, the processor waits for data which is transmitted from the main storage. A cache apparatus is a memory which operates at a high speed although a capacity is smaller than that of the main storage, is arranged between the processor and the main storage, and reduces an apparent access time to the main storage, thereby reducing a data waiting time of the processor.

FIG. 1 shows a table structure of a cache memory provided for a cache apparatus. A cache line 122 serving as a unit of storage comprises a tag 124 and data 130. The tag 124 includes a status tag 126 and an address tag 128. When a reading request is received from a processor, the cache memory searches the cache line having the address tag 128 whose address value coincides with that of a request address. When the cache line having the coincident address value does not exist, it results in a cache miss. Even if there is a cache line having the coincident address value, it results in a cache miss so long as the data held in the cache line is invalid on the basis of the status tag 126. In case of the cache miss, it is necessary to access the main storage or another cache memory. When the cache line in which the address value of the address tag 128 coincides exists and the data held in the cache line is valid on the basis of the status tag 126, it results in a cache hit. In case of the cache hit, since it is unnecessary to access to the main storage or another cache, a data waiting time of the processor is short. As mentioned above, in the cache memory apparatus, when the cache line whose address value coincides with that of the request address exists, whether it is necessary to access to the main storage or another cache memory or not and whether the data waiting time of the processor is short or not are determined in accordance with whether the data held in the cache line is valid or invalid.

On the other hand, in a multiprocessor system, in many cases, each processor has a cache apparatus. As for the data in the cache memory provided for each processor, it is necessary to keep correctness of the data, namely, consistency of the data among the cache memories. To keep the consistency of data, each cache memory is managed in accordance with a rule called a cache coherence protocol to keep matching performance of the data among the cache memories. Consequently, it is possible access the data in the cache memory. A state where the consistency of the data is maintained among the cache memories in the multiprocessor system will now be explained with respect to a cache apparatus using an MESI protocol known as an invalidation type cache coherence protocol as an example.

FIG. 2A shows a status transition for a reading request of the MESI protocol. FIG. 2B shows a status transition for a writing request of the MESI protocol. Symbols of the status transition denote the following contents.

M: Modified. Valid data has been held only in one of a plurality of caches and the data has been modified. It is not guaranteed that a value of the data is the same as that in the main storage.

E: Exclusive. Valid data has been held only in one of a plurality of caches.

S: Shared. The same data has been held in a plurality of caches.

I: Invalid. The data in the cache is invalid.

self: Case where a request from a self processor has been processed.

other: Case where a request from another cache apparatus has been processed.

self-if copy: Case where the cache is in the invalid status for a reading request and the other caches hold the data.

self-if no copy: Case where the cache is in the invalid status for a reading request and no cache holds the data.

In this case, since the state where no data exists in the cache is equivalent to a case where data has been held in the cache in a status of Invalid I in a practical sense, for convenience, the Invalid I status denotes both the following cases.

I. Case where the data has been held in the Invalid I status into the cache.

II. Case where no data exists in the cache

Similarly, such an expression that no data exists in the cache denotes both the following cases.

I. Case where no data really exists in the cache.

II. Case where the data has been held in the Invalid I status into the cache.

FIG. 3A shows cache apparatuses of the multiprocessor system. Cache apparatuses 100-1 and 100-2 are provided for processors 102-1 and 102-2, respectively, and they are connected to a main storage 106 in common through a bus 104. As shown in FIG. 3A, it is assumed that data has been held in the Shared S status into a certain cache line in the cache memories of the cache apparatuses 100-1 and 100-2. As shown in FIG. 3B, when a writing request for the data of the cache apparatus 100-1 is issued from the processor 102-1, the data in the cache apparatus 100-1 is modified and the Shared S status is changed to the Modified M status. However, the consistency of the data between the cache apparatuses 100-1 and 100-2 cannot be maintained if the data in the cache apparatus 100-1 is merely modified. Therefore, after the invalidating operation to modify the Shared S status of the cache apparatus 100-2 to the Invalid I status is performed, the operation to modify the data in the cache memory 100-1 is needed. After that, as shown in FIG. 3C, when the processor 102-2 issues a reading request for the modified data, since the data in the cache apparatus 100-2 has been invalidated to the Invalid I status by the writing request from the processor 102-1 in FIG. 3B, the reading request from the processor 102-2 issued after that causes a cache miss.

Ordinarily, a block size of the cache line is larger than a size of data that is handled by the processor. It is now assumed that the cache block size is equal to the size of two words and the size of the data which is processed by the processor is equal to the size of one word, namely, the half size. As shown in FIG. 4A, it is assumed that the cache apparatuses 100-1 and 100-2 hold the same data existing in cache lines 122-1 and 122-2, for example, data having a 2-word length in which the data in the head 1-word portion is set to "12" and the data in the latter 1-word portion is set to "34". In such a state, as shown in FIG. 4B, it is assumed that the processor 102-1 generates the writing request for the data in the head 1-word portion of the cache line 122-1 and the value is rewritten from "12" to "56". At this time, since the status of the cache memory of each of the cache apparatuses 100-1 and 100-2 is managed on the unit basis of each of the cache lines 122-1 and 122-2, all of the data in the cache line 122-2 of the cache apparatus 100-2 is invalidated by the status transition to Invalid I. Subsequently, as shown in FIG. 4C, it is assumed that the reading request of the cache line 122-2 in the cache apparatus 100-2 from the processor 102-1 is a reading request for the data in the latter 1-word portion. In this case, in spite of the fact that the values of the data held in the latter 1-word portions of the cache lines 122-1 and 122-2 of the cache apparatuses 100-1 and 100-2 are the same as "34", since the status of the cache line 122-2 is Invalid I, it results in a cache miss. The access operation to the main storage or another cache occurs and the processor 102-2 enters a data waiting state. It is the cache miss due to a so-called false sharing. The invalidating operation causing such a cache miss is called "unpreferable invalidating operation".

On the other hand, as shown in FIG. 5A, it is assumed that certain data has been held in the Exclusive E status in the cache apparatus 100-1 of the processor 102-1 and there is no data or the data has been held in the Invalid I status in the cache apparatus 100-2 of the processor 102-2. In this instance, as shown in FIG. 5B, when the reading request for the data in the cache apparatus 100-2 is issued from the processor 102-2, the data held in the Exclusive E status in the cache apparatus 100-1 is transferred to the cache apparatus 100-2 and provided to the processor 102-2. Consequently, the data is shared by the cache apparatuses 100-1 and 100-2. Accordingly, the operation to transfer the data from the cache apparatus 100-1 or main storage to the cache apparatus 100-2 and the operation to change the status from Exclusive E of the cache apparatus 100-1 to Shared S are needed. As mentioned above, after the status of the cache apparatus 100-1 was changed from Exclusive E to Shared S in response to the reading request from the processor 102-2, as shown in FIG. 5C, when the processor 102-1 issues the writing request, the invalidating operation to change the status of the cache apparatus 100-2 from Shared S to Invalid I is needed. After the invalidation, the status of the cache apparatus 100-1 is changed from Shared S to Modified M. The recent processor has functions for dynamically or statically predicting a branching of the conditions and speculatively executing the commands. Consequently, the processor issues a speculative reading request. The execution of the speculative reading command is a command execution based on the prediction. Accordingly, when the prediction is correct, it is fine. When it is wrong, the speculative execution result is abandoned. In other words, there is a possibility that the data read out by the reading request executed speculatively is not used. Even when the reading request from the processor 102-2 in FIG. 5B is a reading request based on the erroneous prediction, the operation to change the status of the cache apparatus 100-1 from Exclusive E to Shared S is executed in response to the reading request from the processor 102-2. As shown in FIG. 5C, therefore, in the writing request from the processor 102-1 which is issued after that, the invalidating operation to change the status of the data of the cache apparatus 100-2 in the status of Shared S which is not needed essentially to Invalid I is necessary. The operation to change the status of the cache memory to Shared S due to the execution of the reading request whereby the read-out data is not used as a result is called "unpreferable reading operation".

SUMMARY OF INVENTION

According to the invention, there are provided a cache apparatus and a control method, in which a cache miss which is caused by the "unpreferable invalidating operation" is reduced and a data waiting time of a processor is shortened.

According to the invention, there are further provided a cache apparatus and a control method, in which an invalidating operation which is necessary due to the "unpreferable reading operation" is reduced and a data waiting time of a processor is shortened.

According to the invention, there are provided cache apparatuses which are provided for every plurality of processors, mutually connected by a bus, and connected to a main storage by the bus, each comprising a cache memory in which a part of data in the main storage is held on a cache line unit basis and a status of the data held in the cache line is distinguished by three kinds of statuses I. Valid II. Invalid III. Unknown and a cache controller for, when a processing request is received from a self processor or another cache apparatus, processing the data held in the relevant cache line in accordance with the status of Valid, Invalid, or Unknown and, after the processing, changing the status of the holding data in the relevant cache line to a predetermined status determined in order to keep the cache coherence. As mentioned above, according to the invention, it is permitted that the data in which whether the validity of the data is valid or invalid is not certain is stored in the cache line as data whose validity is unknown. The problem is solved by processing the "unpreferable invalidating operation" by a "weak invalidating operation (weak-invalidate)" and by processing the "unpreferable reading operation" by a "weak reading operation (weak-read)". The "weak invalidating operation" permits that the data in the cache line is continuously held as data whose validity is unknown instead of invalidating the cache line. For example, in the "unpreferable invalidating operation" of the MESI protocol for the cache coherence, when a writing request is issued to one of the two cache memory data in the Shared S status, the data in the other cache memory is invalidated. However, in the "weak invalidating operation" of the invention, the data is continuously held as data whose validity is unknown without being invalidated. Therefore, although a cache miss occurs by the reading request from the processor according to the "unpreferable invalidating operation", according to the "weak invalidating operation" of the invention, since the cache memory holds the data whose validity is unknown, the data can be supplied as speculation data to the processor in response to the reading request. Such a "weak invalidating operation" of the invention can be regarded as an MESIU protocol in which the Unknown U status is added to the MESI protocol. In a cache management control according to the MESIU protocol for realizing the "weak invalidating operation" of the invention, the "weak reading operation" of the invention is executed when a weak reading request which permits the processor to provide the data which has been held in the cache memory and whose validity is unknown as speculation data is issued. In this case, the cache apparatus which received the reading request reads out the holding valid data, transfers it to the other cache apparatus, responds to a requesting source, and copies it to the self cache apparatus. At this time, in the "weak reading operation" of the invention, the data transferred from the other cache memory is handled as data whose validity is unknown instead of the valid data. That is, in the "unpreferable reading operation" of the MESI protocol, each of the data in the cache memory in the Invalid I status is changed to the Shared S status in the case where it is transferred from the other cache memory in the Exclusive E status. However, in the case where the data is processed by the "weak reading operation" of the invention, the data in the other cache memory is not changed but held in the Exclusive E status, and the data transferred to the cache memory as a reading target is held as data whose validity is unknown, namely, as data in the Unknown U status. Therefore, after that, even if a writing request is issued to the other cache memory in the Exclusive E status, the invalidating operation of the cache memory in which the same data is held in the Unknown U status is unnecessary. The "weak reading operation" of the invention can be set as a function of the cache apparatus in the cases other than the case where the weak reading request which permits the processor to provide the data which has been held in the cache memory and whose validity is unknown as speculation data is issued.

According to another embodiment of the invention, there are provided cache apparatuses which are provided for every plurality of processors, mutually connected by a bus, and connected to a main storage by the bus, each comprising a cache memory in which a part of data of the main storage is held on a cache line unit basis and a status of the data held in the cache line is distinguished by two kinds of statuses I. Valid II. Unknown and a cache controller for, when a processing request is received from a self processor or another cache apparatus, processing the data held in the relevant cache line in accordance with the status of Valid or Unknown and, after the processing, changing the status of the holding data in the relevant cache line to a predetermined status determined in order to keep the cache coherence.

Also in this case, it is permitted that the data in which whether the validity of the data is valid or not is not certain is stored in the cache line as data whose validity is unknown. The problem is similarly solved by processing the "unpreferable invalidating operation" by the "weak invalidating operation (weak-invalidate)" and by processing the "unpreferable reading operation" by the "weak reading operation (weak-read)". It can be regarded as an MESU protocol in which the Invalid I status is removed from the MESIU protocol of the invention.

When a reading request is issued to the cache line which holds the data whose validity is unknown, the cache controller discriminates whether the providing of the speculation data to the requesting source is permitted or inhibited. When it is determined that the providing is permitted, the data whose validity is unknown is provided to the requesting source as the speculation data. When it is decided that the providing is inhibited, the valid data is obtained from the other cache apparatus or the main storage and provided to the requesting source. After the speculation data is provided to the requesting source, when a validity confirming request of the speculation data is issued from the requesting source, the cache controller confirms a real validity of the speculation data and notifies the requesting source of a result of the confirmation. It is also possible to construct the cache controller in such a manner that the speculation data is provided to the requesting source and, at the same time, the real validity of the speculation data is confirmed, the confirmation result is stored, and the stored confirmation result of the validity is notified to the requesting source when the confirming request of the validity of the speculation data is issued from the requesting source. Further, it is also possible to construct the cache controller in such a manner that the speculation data is provided to the requesting source and, at the same time, the real validity of the speculation data is confirmed by the cache controller itself, and the confirmation result is notified to the requesting source. When it is determined from the confirmation result that the speculation data is valid, the cache controller notifies the processor as a requesting source of the confirmation result and allows the processor to acknowledge an execution result of a command based on the speculation data. When it is determined from the confirmation result that the speculation data is invalid, the cache controller notifies the processor as a requesting source of the confirmation result and allows the processor to abandon the execution result of the command based on the speculation data. Owing to the cache apparatus of the invention which can hold the data whose validity is unknown, the data can be speculatively supplied to the processor. By providing the speculation data, the cache miss is reduced, the waiting time of the processor is shortened, and the cache performance is improved.

When the reading request for the cache line holding the data which has a predetermined specific address in the main storage and whose validity is unknown is issued, the cache controller inhibits to provide the data as speculation data to the requesting source. When the reading request for the cache line holding the data which has an address other than the specific address in the main storage and whose validity is unknown is issued, the cache controller permits that the data is provided as speculation data to the requesting source. When the reading request generated by the execution of the speculation data inhibiting command by the processor is received to the cache line holding the data whose validity is unknown, the cache controller inhibits to provide the data as speculation data to the requesting source. When the reading request generated by the execution of the speculation data permitting command by the processor, for example, as a result of a branch prediction is received to the cache line holding the data whose validity is unknown, the cache controller permits that the data is provided as speculation data to the requesting source. Whether the request is the speculative reading request or not is discriminated from the address in the main storage or from the processor executing command and the cache management control in which the speculative command execution of the processor and the ordinary command execution which is not speculative are distinguished is executed. The cache controller executes the MESIU protocol of the cache coherence such that the status of the data held in the cache line is distinguished by five statuses in which the status U showing that the validity of the data is unknown is added to the MESI protocol of the cache coherence in which the status of the holding data in the cache line is distinguished by four statuses of Modified M indicative of validation, Exclusive E, Shared S, and Invalid I. The MESIU protocol realizes the "weak invalidating operation" of the invention as mentioned above.

In the case where the reading request for the holding data in the cache line is processed, the cache controller processes as follows on the basis of the MESIU protocol.

I. If there is the reading request from the self processor in the Modified M status, the status is changed to the same Modified M status. If there is the reading request from the other cache apparatus, the status is changed to the Shared S status.

II. If there is the reading request from the self processor in the Exclusive E status, the status is changed to the same Exclusive E status. If there is the reading request from the other cache apparatus, the status is changed to the Shared S status.

III. If there is the reading request from the self processor or the reading request from the other cache apparatus in the Shared S status, the status is changed to the same Shared S status.

IV. If there is the reading request from the self processor in the Invalid I status and the other cache apparatus does not hold the relevant line, the status is changed to the Exclusive E status. If the other cache apparatus holds the relevant line, the status is changed to the Shared S status. Further, if there is the reading request from the other cache apparatus, the status is changed to the same Invalid I status.

V. If the data is copied from the main storage in response to the reading request from the self processor in the Unknown U status, the status is changed to the Exclusive E status. If the data is copied from the other cache apparatus, the status is changed to the Shared S status. Further, if there is the reading request from the other cache apparatus, the status is changed to the same Unknown U status.

In the case where the cache controller processed the writing request for the holding data in the cache line, it processes the data as follows on the basis of the MESIU protocol.

I. If there is the writing request from the self processor in the Modified M status, the status is changed to the same Modified M status. If there is the writing request from the other cache apparatus, the status is changed to the Unknown U status.

II. If there is the writing request from the self processor in the Exclusive E status, the status is changed to the Modified M status. If there is the writing request from the other cache apparatus, the status is changed to the Unknown U status.

III. If there is the writing request from the self processor in the Shared S status, the status is changed to the Modified M status. If there is the writing request from the other cache apparatus, the status is changed to the Unknown U status.

IV. If there is the writing request from the self processor in the Invalid I status, the status is changed to the Modified M status. If there is the writing request from the other cache apparatus, the status is changed to the same Invalid I status.

V. If there is the writing request from the self processor in the Unknown U status, the status is changed to the Modified M status. If there is the writing request from the other cache apparatus, the status is changed to the same Unknown U status.

In the case where the cache controller processed a weak reading request which permits to provide the data held in the Unknown U status and is issued from the processor, it processes the data as follows on the basis of the MESIU protocol for cache coherence in the weak reading mode.

I. If there is the weak reading request from the self processor in the Modified M status, the status is changed to the same Modified M status. If there is the weak reading request from the other cache apparatus, the status is changed to the Exclusive E status.

II. If there is the weak reading request from the self processor in the Exclusive E status or the weak reading request from the other cache apparatus, the status is changed to the same Exclusive E status.

III. If there is the weak reading request from the self processor or the weak reading request from the other cache apparatus in the Shared S status, the status is changed to the same Shared S status.

IV. If there is the weak reading request from the self processor in the Invalid I status and the other cache apparatus does not hold the relevant line, the status is changed to the Exclusive E status. If the other cache apparatus holds the relevant line, the status is changed to the Unknown U status. Further, if there is the weak reading request from the other cache apparatus, the status is changed to the same Invalid I status.

V. If there is the weak reading request from the self processor or the weak reading request from the other cache apparatus in the Unknown U status, the status is changed to the same Unknown U status.

The MESIU protocol to realize the weak reading request can be also fixedly set by the cache controller without being executed when the weak reading request is received from the processor. The cache controller has the MESU protocol in which the status of the holding data in the cache line is distinguished by four statuses obtained by adding the Unknown U status showing that the validity of the data is unknown to the MES protocol in which the status of the holding data is distinguished by three statuses of Modified indicative of the validity, Exclusive, and Shared.

In the case where the cache controller processed the reading request for the holding data in the cache line, it processes the data as follows on the basis of the MESU protocol.

I. If there is the reading request from the self processor in the Modified M status, the status is changed to the same Modified M status. If there is the reading request from the other cache apparatus, the status is changed to the Shared S status.

II. If there is the reading request from the self processor in the Exclusive E status, the status is changed to the same Exclusive E status. If there is the reading request from the other cache apparatus, the status is changed to the Shared S status.

III. If there is the reading request from the self processor or the reading request from the other cache apparatus in the Shared S status, the status is changed to the same Shared S status.

IV. If there is the reading request from the self processor in the Unknown U status and the other cache apparatus does not hold the relevant line, the status is changed to the Exclusive E status. If the other cache apparatus holds the relevant line, the status is changed to the Shared S status. Further, if there is the reading request from the other cache apparatus, the status is changed to the same Unknown U status.

In the case where the cache controller processed the writing request for the holding data in the cache line, it processes the data as follows on the basis of the MESU protocol.

I. If there is the writing request from the self processor in the Modified M status, the status is changed to the same Modified M status. If there is the writing request from the other cache apparatus, the status is changed to the Unknown U status.

II. If there is the writing request from the self processor in the Exclusive E status, the status is changed to the Modified M status. If there is the writing request from the other cache apparatus, the status is changed to the Unknown U status.

III. If there is the writing request from the self processor in the Shared S status, the status is changed to the Modified M status. If there is the writing request from the other cache apparatus, the status is changed to the Unknown U status.

IV. If there is the writing request from the self processor in the Unknown U status, the status is changed to the Modified M status. If there is the writing request from the other cache apparatus, the status is changed to the same Unknown U status.

In the case where the cache controller processed a weak reading request which permits to provide the speculation data which has been held in the Unknown U status in the cache line and is issued from the processor, it processes the data as follows on the basis of the MESU protocol.

I. If there is the reading request from the self processor in the Modified M status, the status is changed to the same Modified M status. If there is the weak reading request from the other cache apparatus, the status is changed to the Exclusive E status.

II. If there is the reading request from the self processor or the weak reading request from the other cache apparatus in the Exclusive E status, the status is changed to the same Exclusive E status.

III. If there is the reading request from the self processor or the reading request from the other cache apparatus in the Shared S status, the status is changed to the same Shared S status.

IV. If there is the reading request from the self processor in the Unknown U status and the other cache apparatus does not hold the relevant line, the status is changed to the Exclusive E status. If the other cache apparatus holds the relevant line or there is the reading request from the other cache apparatus, the status is changed to the same Unknown U status.

The MESU protocol to realize the weak reading request can be also fixedly set by the cache controller in the cases other than the case of executing it when the weak reading request is received from the processor.

The invention also provides a cache control method whereby cache apparatuses provided for every plurality of processors are mutually connected by the bus and connected to the main storage by the bus.

This cache control method is characterized in that

I. a part of the data in the main storage is held in the cache memory on a cache line unit basis and the status of the data held in the cache line is distinguished by three kinds of statuses of Valid, Invalid, and Unknown, II. when the processing request is received from the self processor or the other cache apparatus, the data held in the relevant cache line is processed in accordance with the status of Valid, Invalid, or Unknown (MESUI protocol), and III. the status of the holding data in the relevant cache line is changed to a predetermined status in order to keep the cache coherence after the processing of the request.

According to another aspect of the cache control method of the invention,

I. a part of the data in the main storage is held in the cache memory on a cache line unit basis and the status of the data held in the cache line is distinguished by two kinds of statuses of Valid and Unknown, II. when the processing request is received from the self processor or the other cache apparatus, the data held in the relevant cache line is processed in accordance with the status of Valid or Unknown (MESU protocol), and III. the status of the holding data in the relevant cache line is changed to a predetermined status in order to keep the cache coherence after the processing of the request.

The details of the cache control method according to the invention are fundamentally the same as those in case of the apparatus construction.

BRIEF DESCRIPTION OF DRAWINGS

FIGS. 3A to 3C are explanatory diagrams of the cache operation which causes the unpreferable invalidating operation in the MESI protocol;

FIGS. 5A to 5C are explanatory diagrams of the cache operation which causes the unpreferable reading operation in the MESI protocol;

FIG. 7 is a functional block diagram of the cache apparatus of the invention;

FIG. 9 is an explanatory diagram of a status transition table of the MESIU protocol in FIGS. 8A to 8C;

FIGS. 10A to 10C are explanatory diagrams of the weak invalidating operation of the invention which can solve the problems in the unpreferable invalidating operation in FIGS. 3A to 3C;

FIGS. 11A to 11C are explanatory diagrams of the weak reading operation of the invention which can solve the problems in the unpreferable reading operation in FIGS. 5A to 5C;

FIGS. 12A to 12C are explanatory diagrams of other operation forms of the weak reading operation of the invention;

FIG. 13 is a flowchart for the first embodiment of a cache management control of the invention according to a cache controller in FIG. 7;

FIG. 19 is a flowchart for the third embodiment of a cache management control of the invention according to the cache controller in FIG. 7;

FIG. 21 is an explanatory diagram of a status transition table of the MESU protocol in FIGS. 20A to 20C;

FIG. 25 is a flowchart for the sixth embodiment of the cache management control of the invention according to the cache controller using the MESU protocol in FIGS. 20A to 20C.

BEST MODE FOR CARRYING OUT THE INVENTION (Apparatus construction and functions)

Figure 6:
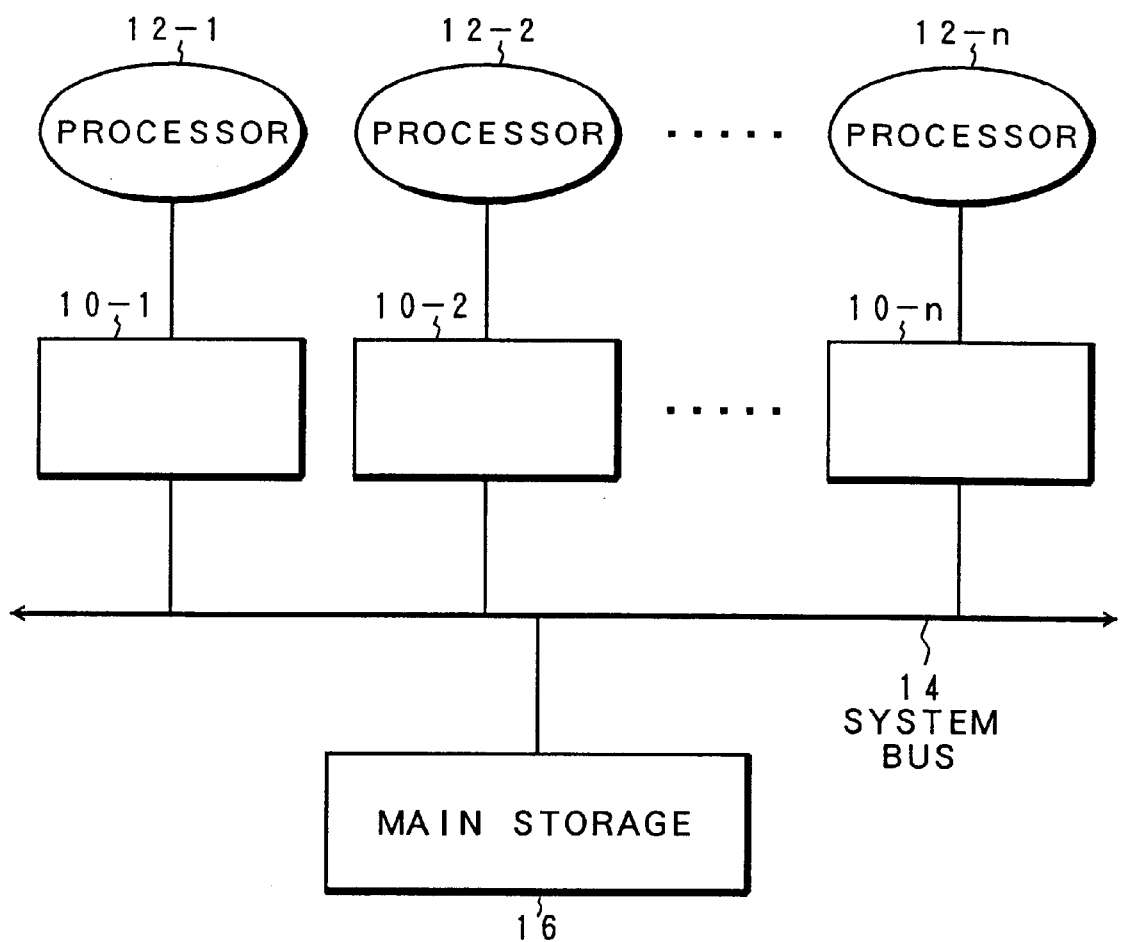
FIG. 6 is a block diagram of a multiprocessor system in which cache apparatuses of the invention are used.

FIG. 6 is a block diagram of a multiprocessor system in which cache apparatuses and a control method of the invention are applied. Cache apparatuses 10-1, 10-2, ..., 10-n of the invention are provided in correspondence to processors 12-1, 12-2, ..., 12-n. The cache apparatuses 10-1 to 10-n are mutually connected by a system bus 14 and further connected to a main storage 16 by the system bus 14. For example, a snoop bus is used as a system bus 14 for connecting the cache apparatuses 10-1 to 10-n. When there is a processing request from one of the processors 12-1 to 12-n to one of the cache apparatuses 10-1 to 10-n, the snoop bus can immediately obtain a status of the data held in the cache line corresponding to the processing request by a status signal of a snoop control line.

Figure 2A:
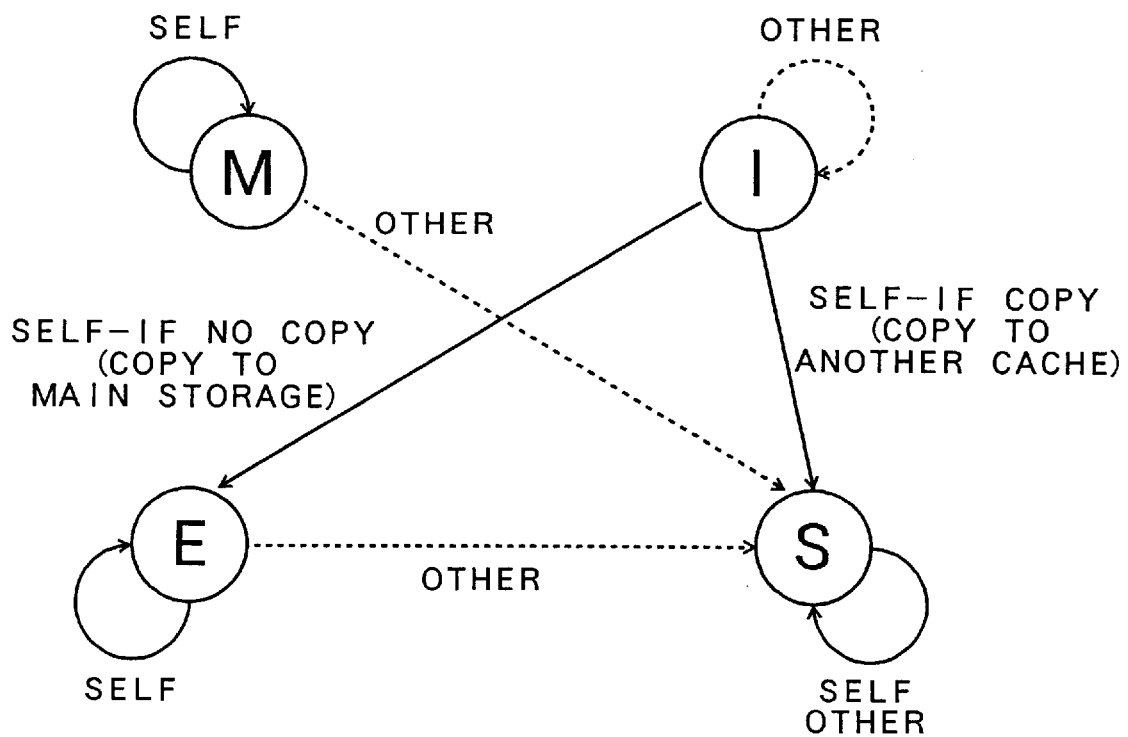
FIGS. 2A and 2B are status transition diagrams of an MESI protocol.
Figure 2B:
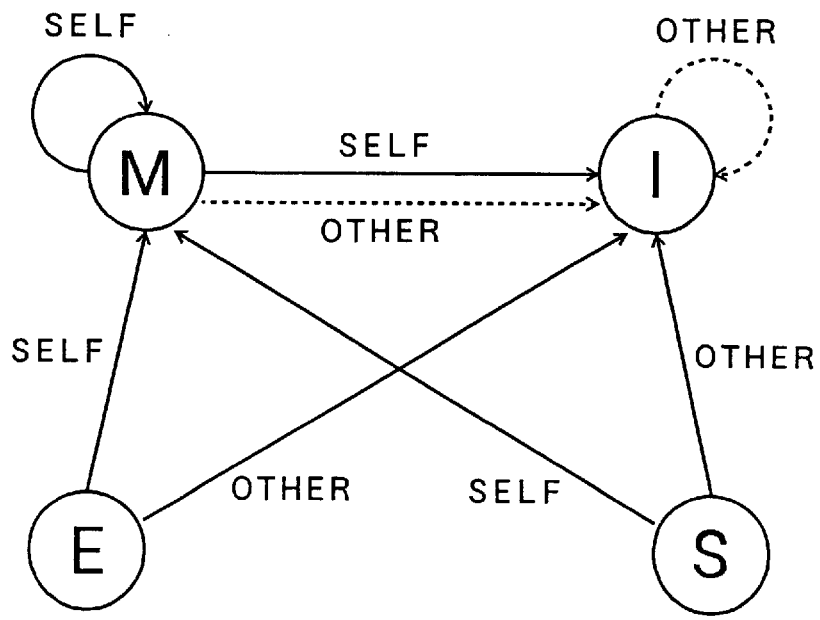
Figure 4A:
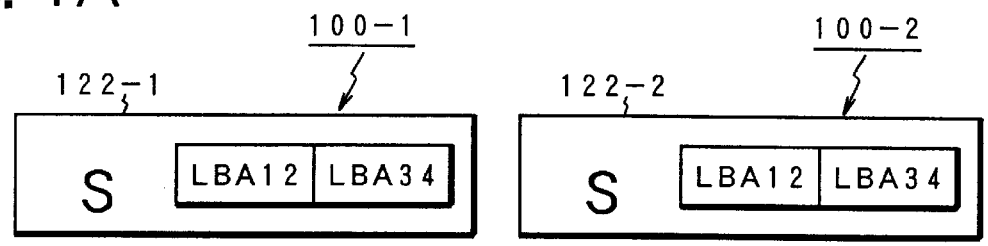
FIGS. 4A to 4C are explanatory diagrams of cache lines in the unpreferable invalidating operation in the MESI protocol.
Figure 4B:
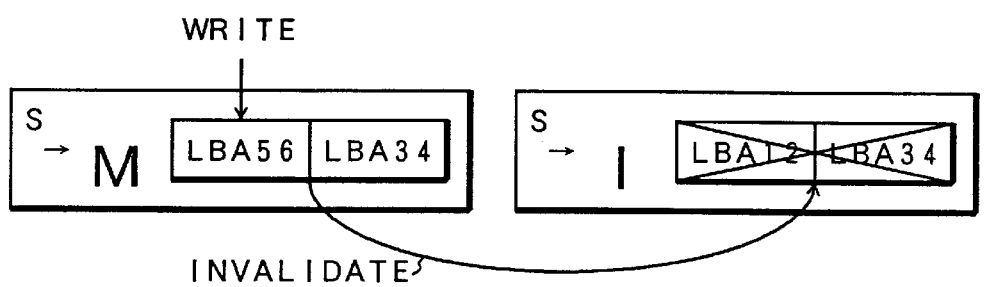
Figure 4C:
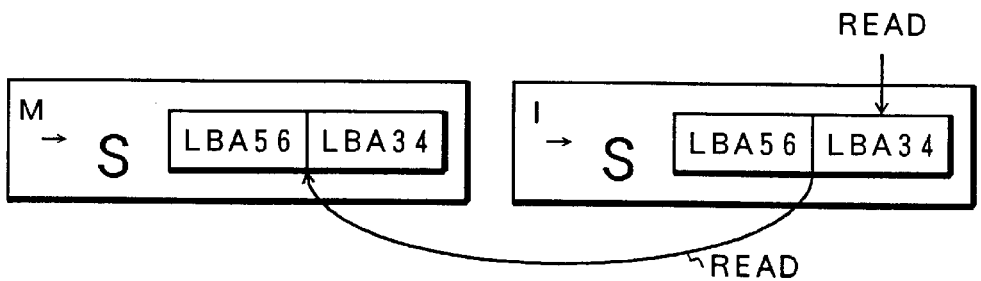

FIG. 7 is a functional block diagram of the cache apparatus 10 of the invention. The cache apparatus 10 is constructed by a cache controller 18 and a cache memory 20. The cache memory 20 holds data on a unit basis of a plurality of cache lines 22. Each cache line 22 includes a tag 24 and data 30. The tag 24 has a status tag 26 and an address tag 28. With respect to the status tag 26 in the cache memory 20, according to the invention, in addition to Valid and Invalid as statuses of the holding data, data whose validity is unknown can be held. A cache control managing unit 32, a status managing unit 34, a processor interface 36, and a bus interface 38 are provided for the cache controller 18. A read protocol processing unit 40, a weak read protocol processing unit 42, a speculation data confirming unit 44, and a write protocol processing unit 46 are provided for the status managing unit 34. When a reading request is received from the processor 12, the cache control managing unit 32 refers to the tag 24 in the cache memory 20 and searches the cache line 22 having the address tag 28 whose address value coincides with the request address. When the cache line whose address value coincides does not exist, a cache miss occurs. The valid data is obtained from the main storage 16 or another cache apparatus and provided to the processor 12. When the cache line whose address coincides with the request address exists, the cache control managing unit 32 executes the process according to the Valid, Invalid, or Unknown status based on the status tag 26 of the relevant cache line. That is, if the status is Valid, the data held in the cache memory 10 is provided to the processor 12. If the status is Invalid, the cache control managing unit 32 obtains the valid data from the other cache apparatus or main storage and responds to the processor 12. Further, if the status is Unknown, the data held in the status where the validity is unknown in the cache memory 20 is provided as speculation data to the processor 12 under a condition that the processor 12 permits that the speculation data is provided. In response to the writing request from the processor 12, the cache control managing unit 32 updates the data in the relevant cache line in the cache memory 20 in case of a cache hit. In case of a miss hit, the unit 32 keeps a new cache line into the cache memory 20 and writes the data therein. In response to the processing requests from the processor 12 or from the other cache apparatus via the system bus 14 by the cache control managing unit 32, the status managing unit 34 executes a status transition control of the status tag 26 on the relevant cache line after the processing request was executed. As a status transition control for the cache coherence by the status managing unit 34, according to the invention, an MESIU protocol in which the Unknown U status showing the holding of the data whose validity is unknown is further added to the MESI protocol in FIGS. 2A to 2C is applied.

Figure 8A:
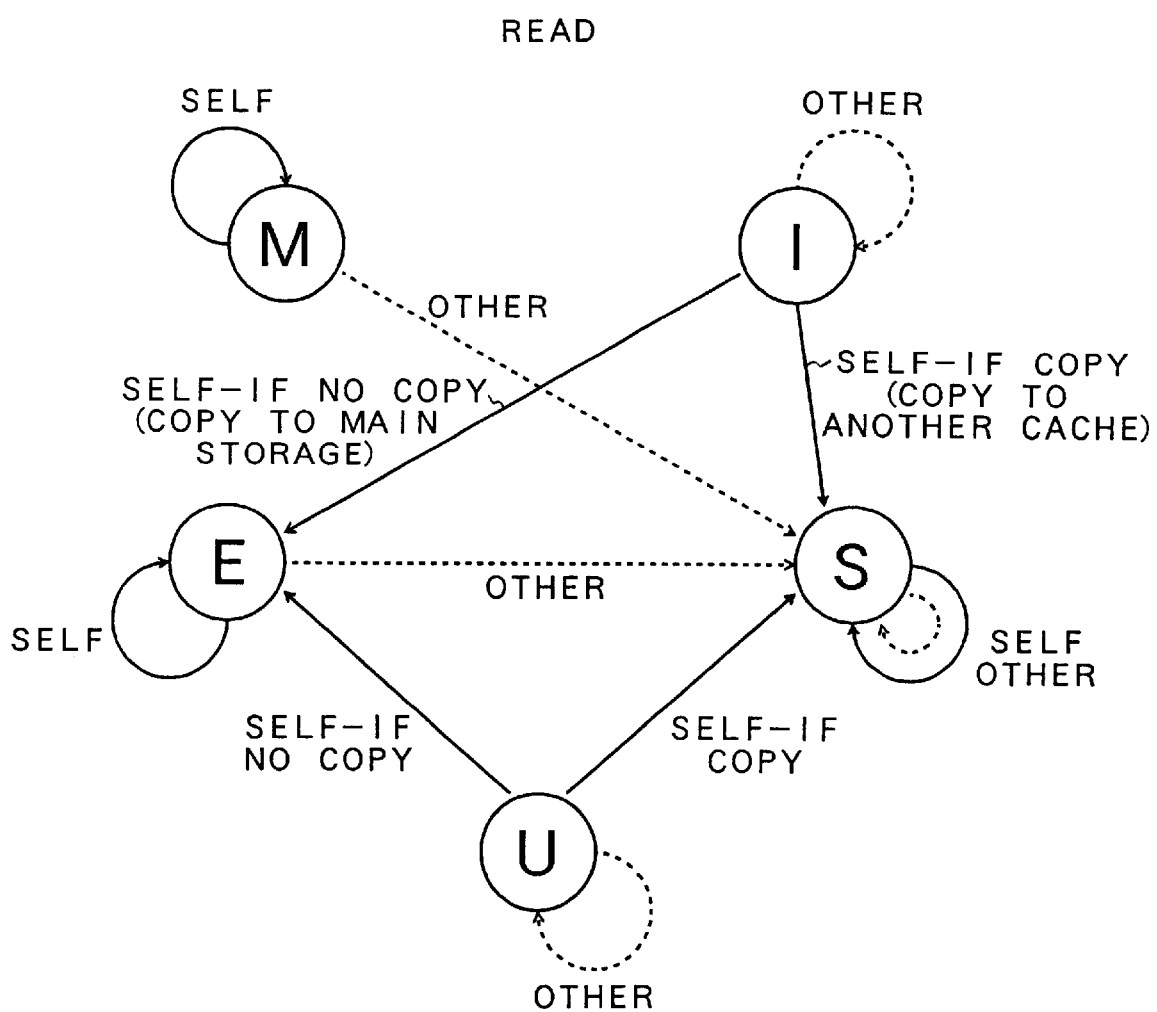
FIGS. 8A to 8C are status transition diagrams of an MESIU protocol for realizing the weak invalidating operation and the weak reading operation of the invention in which data held in a cache is handled as data in an Unknown status.
Figure 8B:
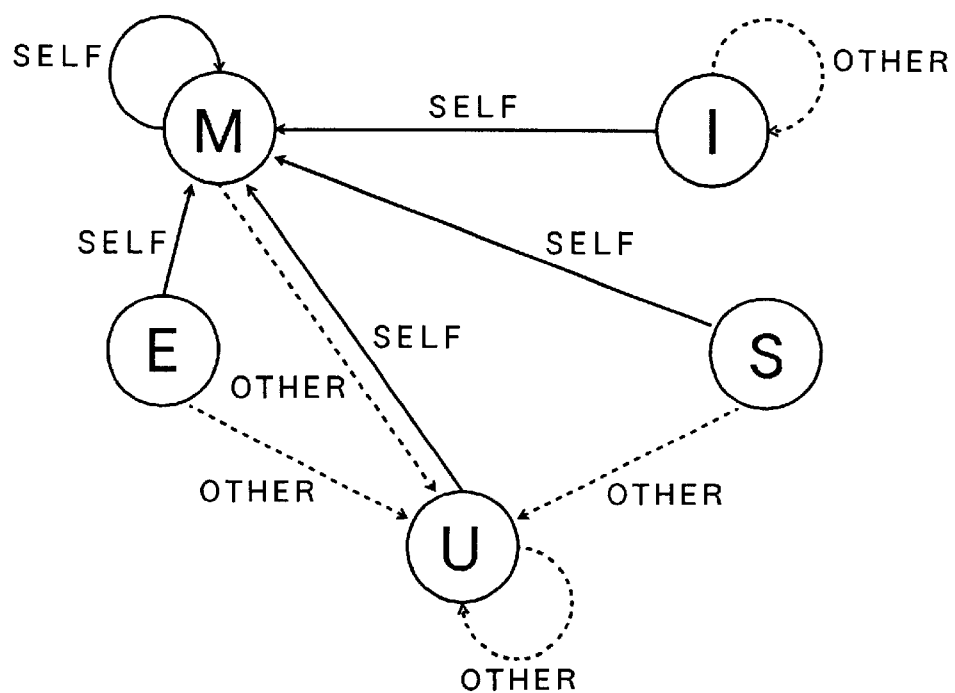
Figure 8C:
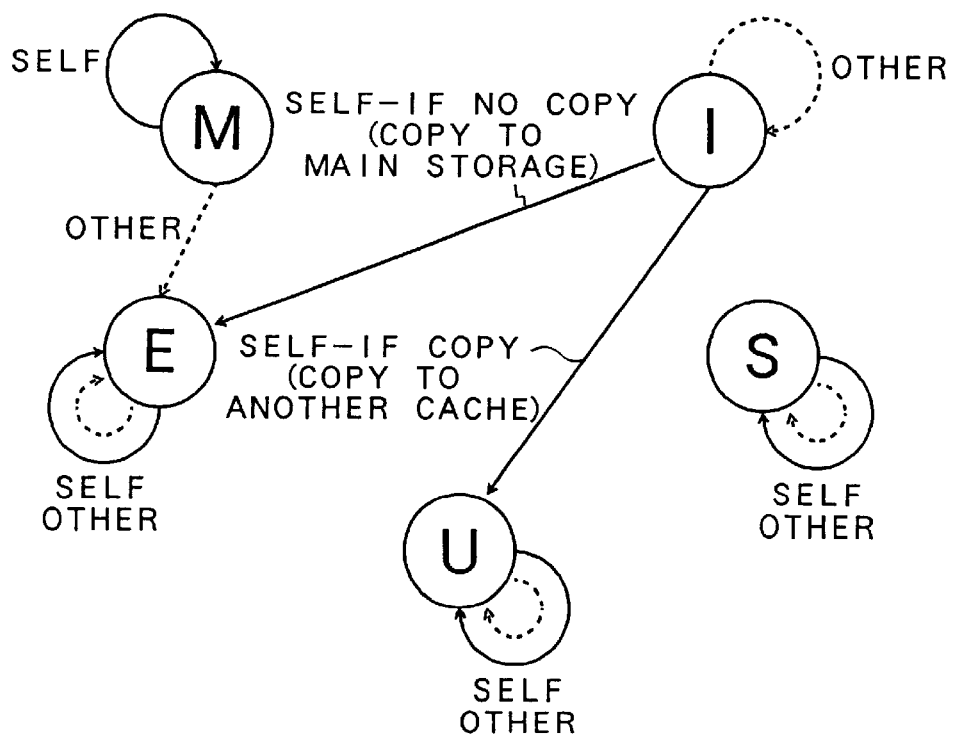

FIGS. 8A to 8C are explanatory diagrams of a status transition of the MESIU protocol which is used in the status managing unit 34 in FIG. 7. That is, FIG. 8A shows the status transition of the MESIU reading protocol for the reading request which is processed by the read protocol processing unit 40. FIG. 8B shows the status transition of the MESIU writing protocol by the write protocol processing unit 46 in FIG. 7. The reading protocol and writing protocol of MESIU in FIGS. 8A and 8B realize the cache management control of the "weak invalidating operation" according to the invention for solving the "unpreferable invalidating operation" in the MESI protocol in FIGS. 3A to 3C. Further, FIG. 8C shows the status transition of the MESIU weak reading protocol which is processed by the weak read protocol processing unit 42 in FIG. 7. The MESIU weak reading protocol realizes the cache management control of the "weak reading operation" of the invention for solving the problem of the "unpreferable reading operation" in the MESI protocol in FIGS. 5A to 5C.

In each protocol in FIGS. 8A to 8C, the status M indicates Modified, the status E indicates Exclusive, the status S indicates Shared, and the status I indicates Invalid. Further, in the invention, Unknown is newly added as a status where the data whose validity is unknown is held. The transition shown by a solid line in the statuses M, E, and S is performed in the case where the reading request is processed from the self processor upon reading of FIG. 8A. A broken line shows the case where the reading request is processed by the other cache apparatus. In the Invalid I status, the reading request in the other apparatus does not cause the status change as shown by broken lines. However, in case of the reading request from the self processor, when the other cache apparatus does not hold the relevant line (self-if no copy), the status is changed to the Exclusive E status. When the other cache apparatus holds the relevant line (self-if copy), the status is changed to the Shared S status. In the status transition of the MESIU writing protocol in FIG. 8B, each of the statuses of M, E, S, I, and U is changed as shown by a solid line with regard to the case where the writing request from the self processor is processed and is changed as shown by a broken line in the case where the writing request from the other cache apparatus is processed. The transitions shown by the broken line and solid line of the MESIU weak reading protocol in FIG. 8C have substantially the same meaning as that of the MESIU reading protocol in FIG. 8A.

FIG. 9 is a status transition table of the MESIU protocol in FIGS. 8A to 8C. According to this status transition table, the status of the data held in the current cache line is shown in the vertical direction, the request from the self processor is shown as "SELF" and the request from the other cache apparatus is shown as "OTHER" as next statuses in the lateral direction. The status transition is shown separately with respect to the reading, writing, and weak reading operations in FIGS. 8A to 8C. Among them, (1) and (2) added to the next statuses "E, S" and "E, U" correspond to "SELF-IF NO COPY" and "SELF-IF-COPY" of the solid lines from the current status I in the reading protocol in FIG. 8A. For example, with respect to (1) of the status "E, S" where in the current status I, the next status is changed as a result of the reading request from the self processor, as shown in the status I in FIG. 8A, if any other cache apparatus does not hold the relevant cache line, the status is changed to the Exclusive E status. When the other cache apparatuses hold the relevant line, the status is changed to the Shared S status. With respect to the next status "E, U" shown at (2), the status transition from the current status I in FIG. 8C to the next status E or U is shown. Further, the transition to the next status "E, S" shown at (3) in FIG. 9 is performed in the case where the reading request is received from the self processor in the current status U in the reading protocol in FIG. 8A. Also in this case, the status is changed to the Exclusive E status when the relevant cache line is not held in all of the cache apparatuses, and the status is changed to the Shared S status when the other cache apparatuses hold the relevant line.

(Weak Invalidating Operation and Weak Reading Operation)

FIGS. 10A to 10C are explanatory diagrams of the "weak invalidating operation" according to the invention at the time when there is a processing request from the same processor as that in the case where the "unpreferable invalidating operation" occurs in the MESI protocol in FIGS. 3A to 3C in the processes by the MESIU protocol in FIGS. 8A to 8C. In FIG. 10A, it is assumed that the same data has been held in the Shared S status with respect to certain cache lines of the two cache apparatuses 10-1 and 10-2. In this status, assuming that the writing request is received from the processor 12-1 for the data held in the Shared S status and the data is processed as shown in FIG. 10B, the status of the cache apparatus 10-1 is changed from Shared S to Modified M in accordance with the status transition of the writing protocol in FIG. 8B. At the same time, the cache apparatus 10-2 in which the same data is held in the cache line is changed to the Unknown U status in accordance with the status transition of the writing protocol in FIG. 8B because the data has been written in the other cache apparatus 10-1. When the Shared S status of the two cache memories 10-1 and 10-2 in FIG. 10A are changed to the Modified M status in response to the writing request from the processor 12-1 to the cache apparatus 10-1 as shown in FIG. 10B, the Shared S status of the other cache apparatus 10-2 is changed to the Unknown U status instead of the Invalid I status as shown in FIG. 3B. This operation is the "weak invalidating operation (weak-invalidate)" of the present invention. Subsequently, as shown in FIG. 10C, when the reading request from the processor 12-2 is processed by the cache apparatus 10-2, the data in this instance is held in the Unknown U status and not invalid. Therefore, a cache hit occurs and the data held in the Unknown U status is provided as speculation data to the processor 12-2 as a requesting source. In this case, like a status transition of the reading protocol in FIG. 8A, the Unknown U status of the cache apparatus 10-2 to which the reading request is issued is changed to the Shared S status and, at the same time, the Modified M status of the other cache apparatus 10-1 is changed to the Shared S status. In response to the writing request from one of the cache apparatuses 10-1 and 10-2 in the Shared S status in FIG. 10A, for example, from the processor 12-1, by executing the weak invalidating operation (weak-invalidate) for setting the cache line of the other cache apparatus 10-2 into the Unknown U status without invalidating it, a miss hit does not occurs when the processor 12-2 issues the reading request to the cache apparatus 10-2 as shown in next FIG. 10C but the data in the Unknown U status can be provided as speculation data to the processor 12-2 as a cache hit. The data waiting time of the processor which is necessary in the Invalid I status can be shortened.

FIGS. 11A to 11C are explanatory diagrams of the "weak reading operation" of the invention according to the weak reading protocol in FIG. 8C. This "weak reading operation" solves the problems in the "unpreferable reading operation" in the MESI protocol in FIGS. 5A to 5C. In FIG. 11A, it is assumed that one of the same data has been held in the Exclusive E status and the other has been held in the Invalid I status in certain cache lines in the two cache apparatuses 10-1 and 10-2. Subsequently, as shown in FIG. 11B, when the processor 12-2 issues the reading request of the data held in the cache line of the cache apparatus 10-2 in the Invalid I status, this reading request is processed as a weak reading request by the cache apparatus 10-2 in the case where it is permitted that such reading request is handled as a weak reading request. That is, when the weak reading request which permits the providing of the speculation data from the processor is recognized, the cache apparatus 10-2 executes the weak reading process according to the status transition of the weak reading protocol in FIG. 8C. According to the weak reading process, since the data in the relevant cache line is in the Invalid I status, the cache apparatus 10-2 requests the weak-read to the cache apparatus 10-1 in the Exclusive E status in response to the weak reading request from the processor 12-2. The cache apparatus 10-2 receives the transfer of the valid data, copies it to the cache line, and provides it to the processor 12-2 as a requesting source. In this instance, in the MESI protocol of FIG. 5B, the cache apparatuses 10-1 and 10-2 are changed to the Shared S status. However, in the weak-read of FIG. 11B, the valid data transferred from the cache apparatus 10-1 is held in the Unknown U status in the cache apparatus 10-2, and the cache apparatus 10-1 maintains the same Exclusive E status.

Figure 1:
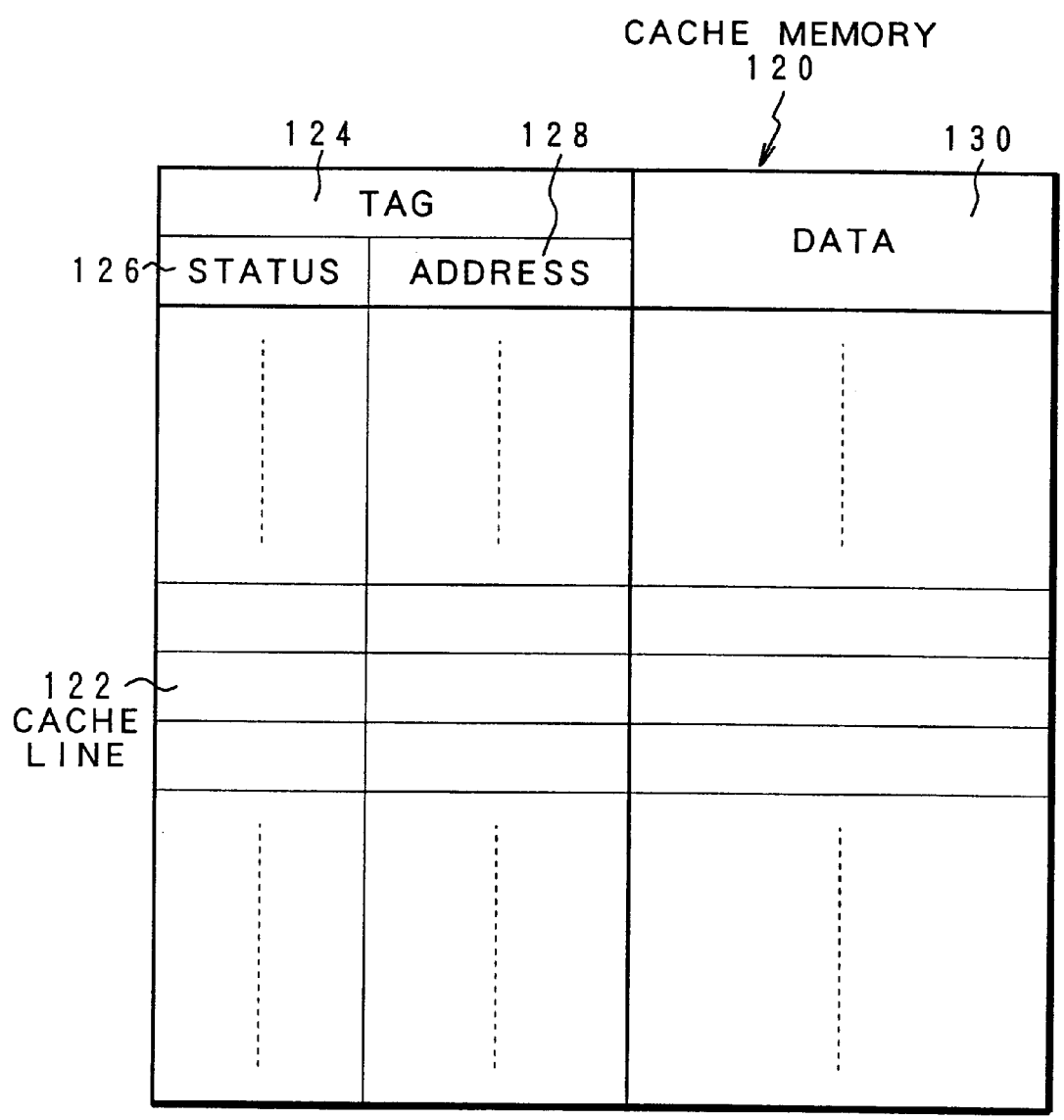
FIG. 1 is an explanatory diagram of a table structure in a cache memory.

Therefore, as shown in FIG. 1C, when the writing request is subsequently issued from the processor 12-1 to the cache apparatus 10-1, although it is necessary to invalidate the other cache apparatus 10-2 according to the MESI protocol in FIG. 5C, the invalidation is unnecessary in FIG. 11C. The same Unknown U status of the data in the cache line of the other cache apparatus 10-2 is maintained. The cache apparatus 10-1 to which the writing request is issued is changed from the Exclusive E status to the Modified M status.

FIGS. 12A to 12C show an example of another cache operation of the weak reading protocol in FIG. 8C. In FIG. 12A, the data in the cache line of the cache apparatus 10-1 is held in the Modified M status, and the same data in the cache line of the cache apparatus 10-2 is held in the Invalid I status. When the processor 12-2 issues a weak reading request which permits the providing of the speculation data in the status of FIG. 12A as shown in FIG. 12B, the valid data in the cache apparatus 10-1 is transferred and copied to the cache apparatus 10-2 in response to the weak reading request and provided to the processor 10-2 as a requesting source. The cache apparatus 10-2 which received the weak reading request is changed from the Invalid I status to the Unknown U status and, at the same time, the cache apparatus 10-1 as a data transferring source is changed from the Modified M status to the Exclusive E status. This is the transition to the same status as that in FIG. 11B. Therefore, even if the writing request is subsequently issued from the processor 12-1 to the cache apparatus 10-1 as shown in FIG.

12C, the invalidation of the other cache apparatus 10-2 in which the same data has been held in the cache line becomes unnecessary.

(Cache Management Control of the MESIU Protocol)

FIG. 13 is a flowchart for the first embodiment of the cache management control by the cache controller 18 in FIG. 7 according to the MESIU protocol in FIGS. 8A to 8C. When the reading request is issued from the processor 12, the cache management control is started. First, in step S1, whether the request data has been possessed or not, namely, whether the request data having the address value of the request address exists in the cache line in the cache memory 20 or not is discriminated. If the request data is possessed, step S2 follows and the validity of the data is discriminated on the basis of the status tag 26 of the cache line. If one of the statuses of Modified M, Shared S, and Exclusive E has been stored in the status tag 26, the data is determined to be valid and step S3 follows. The valid data held in the cache line in the cache memory 20 is read out and provided to the processor 12 as a requesting source. As for the status control after the valid data was provided to the requesting source in step S3, since the current status in the reading protocol in FIG. 8A is changed as Modified M, Shared S, or Exclusive E as shown by the solid line, the same status M, S, or E is maintained. If it is determined that the status is Unknown U as a result of the check about the validity of the data in step S2, step S4 follows. Whether the provided data responsive to the reading request from the processor indicates the request which permits to provide the speculation data from the processor or not is discriminated. The discrimination of whether the provided data is the reading request which permits the processor to provide the speculation data can be made by performing one or both of the following discriminating steps.

I. Whether it is a specific address which inhibits to provide the speculation data in the main storage 16 to the requesting source or not is discriminated.

II. Whether it is the reading request formed by the processor 12 on the basis of the command which inhibits the speculation data or the reading request formed on the basis of the command which permits the speculation data is discriminated.

Figure 14:
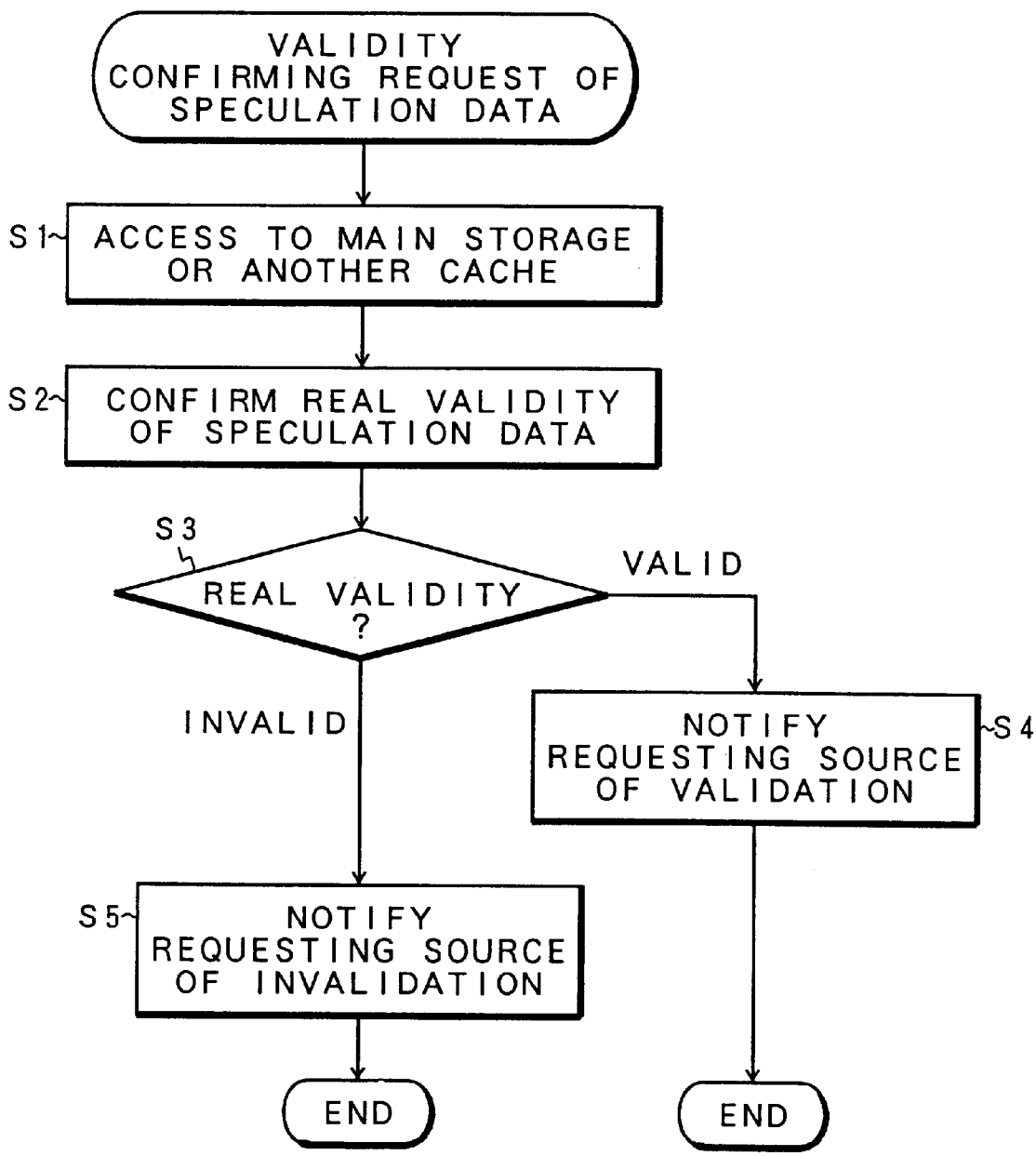
FIG. 14 is a flowchart for a confirmation requesting process which is executed after speculation data is provided to a requesting source in FIG. 13.

If it is determined in step S4 that it is the reading request which permits the providing of the speculation data, step S5 follows. The protocol is switched from the reading protocol in FIG. 8A so far to the weak reading protocol in FIG. 8C. The data held in the Unknown U status in the cache line is supplied as speculation data to the processor 12 as a requesting source. When the supply of the speculation data to the requesting source is finished, the cache apparatus maintains the same Unknown U status like a transition status of the weak-read in FIG. 8C. As mentioned above, when the speculation data is supplied to the processor 12 as a requesting source in step S5, in the case where a confirming request about the validity of the speculation data is received from the processor 12 as a requesting source after that, processes in a flowchart of FIG. 14 are executed. In the validity confirmation requesting process of the speculation data, the main storage or another cache is accessed in step S1 and the real validity of the speculation data is checked in step S2. If it is determined in step S3 that the speculation data is valid from the real validity, the processor as a requesting source is notified of the fact that the speculation data is the valid data in step S4. The processor which received the notification showing that the speculation data is valid acknowledges an execution result of the command based on the speculation data and continues the processes based on it. If it is determined in step S3 that the speculation data is invalid from the real validity, the confirmation result showing that the speculation data is invalid is notified to the processor as a requesting source in step S5. The processor which received the notification showing that the speculation data is invalid abandons the execution result of the command based on the speculation data.

Figure 15:
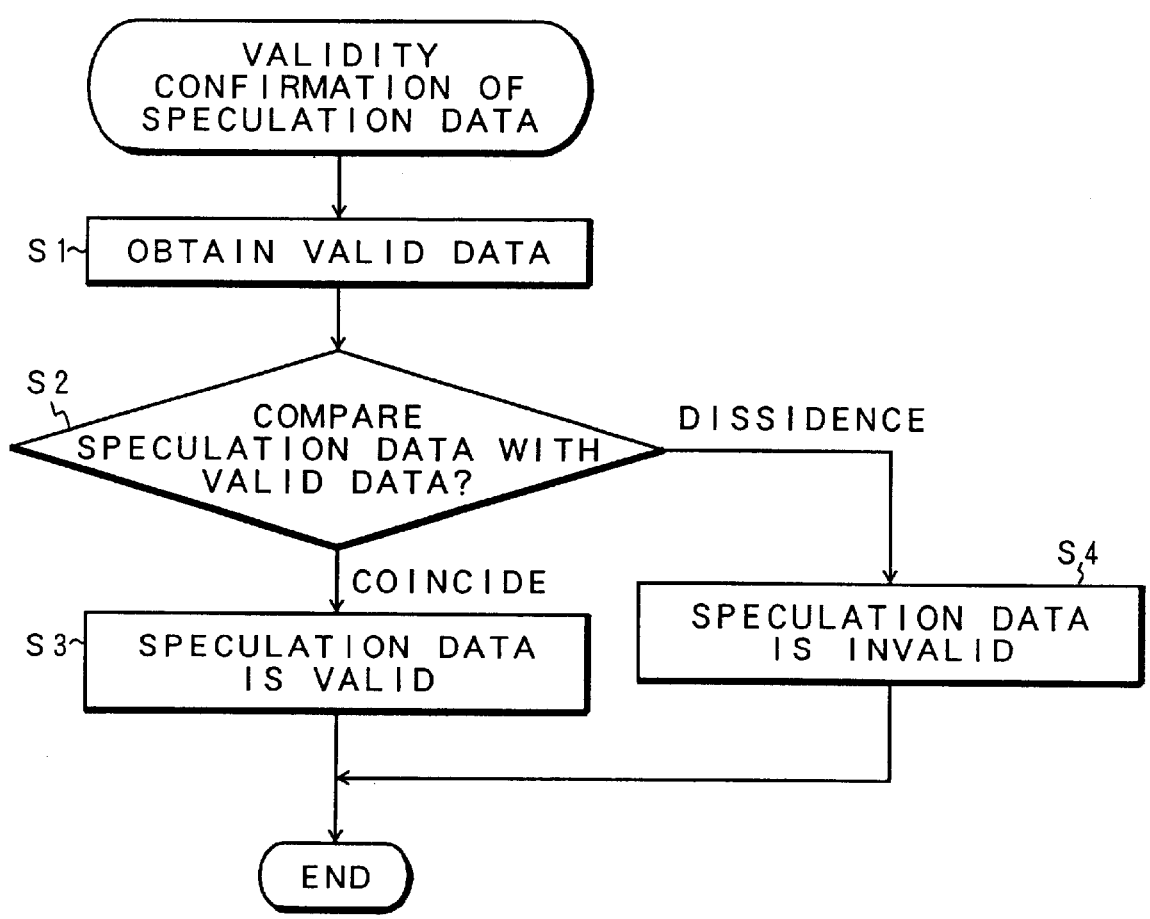
FIG. 15 is a flowchart for confirming a validity of the speculation data in FIG. 14.

FIG. 15 is a flowchart for specific processes for confirming the validity of the speculation data in steps S1 and S2 in FIG. 14. First, in step S1, the main storage or another cache apparatus is accessed and the valid data is held in step S1. In step S2, the speculation data is compared with the obtained valid data. If they coincide, the processor as a requesting source is notified of the fact that the speculation data is valid in step S3. If they not coincide, the fact that the speculation data is invalid is notified in step S4.

Figure 16:
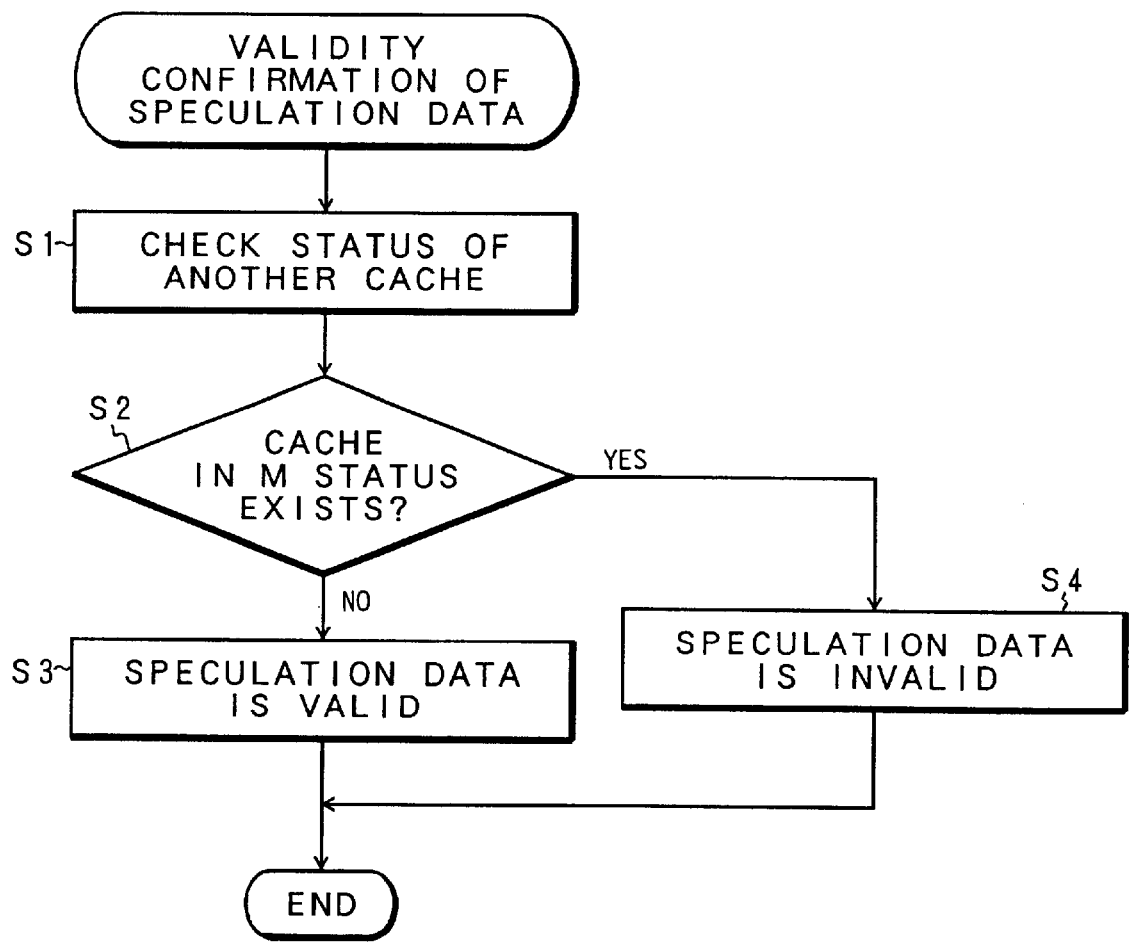
FIG. 16 is another flowchart for confirming a validity of the speculation data in FIG. 14.

FIG. 16 is a flowchart for the other specific processes for confirming the validity of the speculation data in steps S1 and S2 in FIG. 14. In the validity confirming process, the status of the other cache is checked in step S1. In this instance, as shown in FIG. 11C, whether the valid data exists in the Modified M status in the other cache apparatus 10-1 or not is discriminated. If the valid data exists in the Modified M status in the other cache apparatus, step S4 follows. The speculation data is determined to be invalid and this fact is notified to the processor as a requesting source. This is because the fact that the other cache apparatus holds the relevant line in the Modified M status denotes that the data serving as a source of the speculation data has already been modified. On the other hand, if the valid data does not exist in the Modified M status in the other cache apparatus in step S2, the speculation data is determined to be valid and this fact is notified to the processor as a requesting source. This is because the fact that the other cache apparatus does not hold the relevant line in the Modified M status denotes that the data serving as a source of the speculation data is not modified and is equivalent to the speculation data.

Referring again to FIG. 13, when the request data is not possessed in step S1 in response to the reading request from the processor 12, when the holding data in the cache line is in the Invalid I status in step S2, or when the providing of the speculation data to the processor is inhibited in step S4, the processing routine advances to step S6. The main storage 16 or the other cache apparatus is accessed. The valid data is obtained in step S7. The valid data is supplied to the processor 12 as a requesting source in step S8. The access to the other cache apparatus in step S6 is performed in the case where the status of the holding data in the other cache apparatus is one of Modified M, Exclusive E, and Shared S. After the valid data was transferred and copied from the other cache apparatus or the main storage, it is supplied to the processor as a requesting source. In the status transition of the cache apparatus in this case, the status is changed from the current Invalid I status to the Shared S status in a manner similar to that in the reading protocol in FIG. 8A. Even in the other cache apparatus which transferred the data, if it is in the Modified M status, it is changed to the Shared S status, if it is in the Exclusive E status, it is likewise changed to the Shared S status, and if it is in the Shared S status, the same status is maintained. When the other cache apparatus does not hold the relevant line, the cache apparatus is changed from the current Invalid I status in the reading protocol in FIG. 8A to the Exclusive E status.

Figure 17:
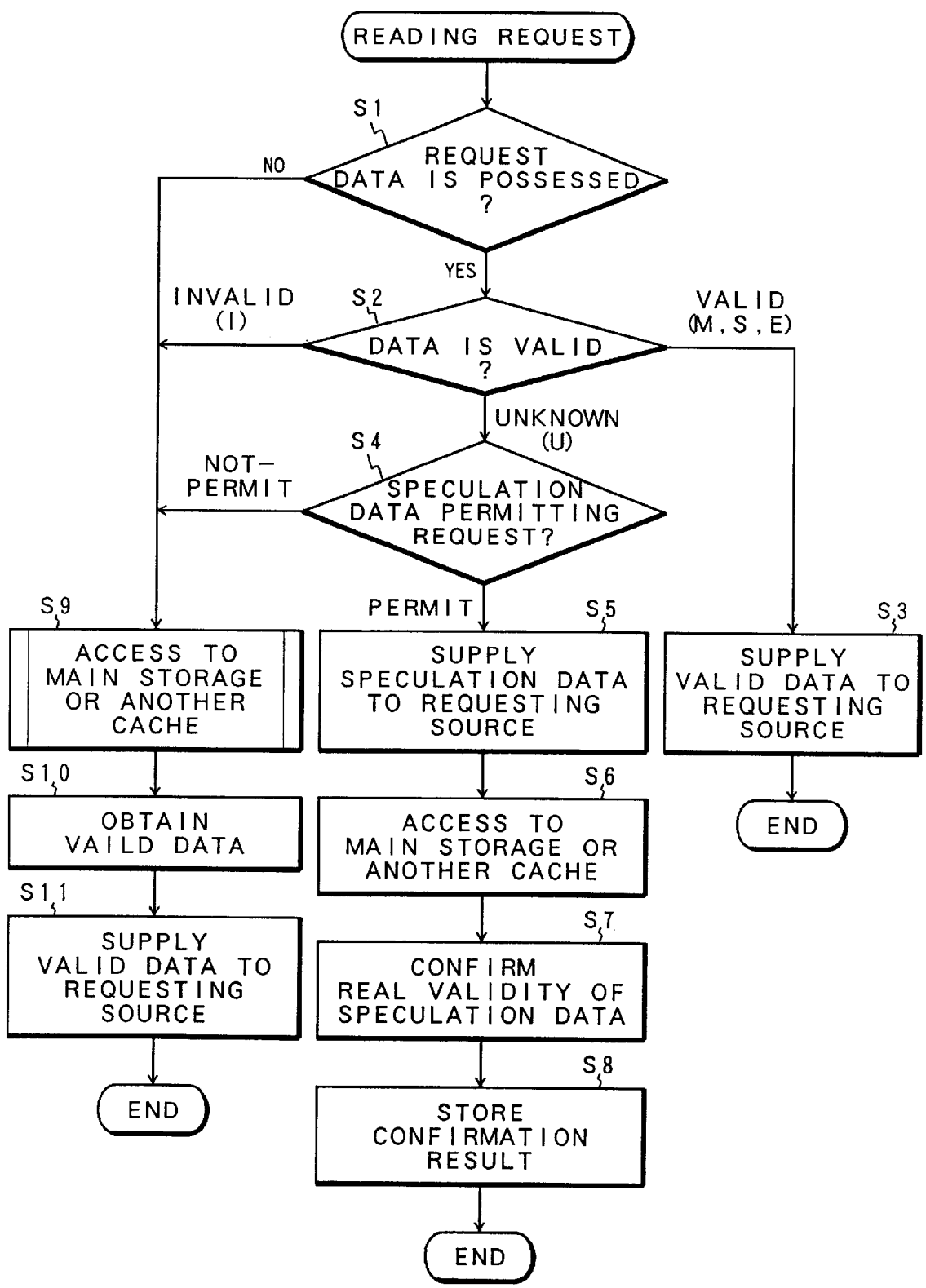
FIG. 17 is a flowchart for the second embodiment of a cache management control of the invention according to the cache controller in FIG. 7.

FIG. 17 is a flowchart for the second embodiment of the cache management control by the MESIU protocol in FIGS. 8A to 8C. The second embodiment is characterized in that after the speculation data was supplied to the processor as a requesting source, the cache apparatus itself confirms the real validity of the speculation data and stores it without receiving the confirming request from the processor as a requesting source, and a storage result is notified when there is the confirming request of the validity of the speculation data from the processor. The discrimination about the possession of the request data in the cache memory 20 in step S1 when the reading request is received from the processor 12, the supply of the valid data to the requesting source in step S3 in dependence on the validity of the data in step S2, and the processes in steps S9 to S11 in the case where the status of the holding data in the cache line is the Invalid I status in step S2 or in the case where the request is not the reading request which permits the speculation data by the processor in step S4 are substantially the same as the processes in steps S1 to S3 and steps S6 to S8 in FIG. 13. On the other hand, if the reading request from the processor is the reading request which permits the speculation data in step S4, the holding data in the Unknown U status is supplied as speculation data to the processor as a requesting source in accordance with the weak reading protocol in FIG. 8C. After that, the main storage or the other cache apparatus is accessed in step S6. The real validity of the speculation data is confirmed in step S7. A confirmation result is stored in step S8. The confirming process about the real validity of the speculation data in this case is also executed in accordance with the flowchart for the confirming process about the validity of the speculation data in FIG. 15 or 16.

Figure 18:
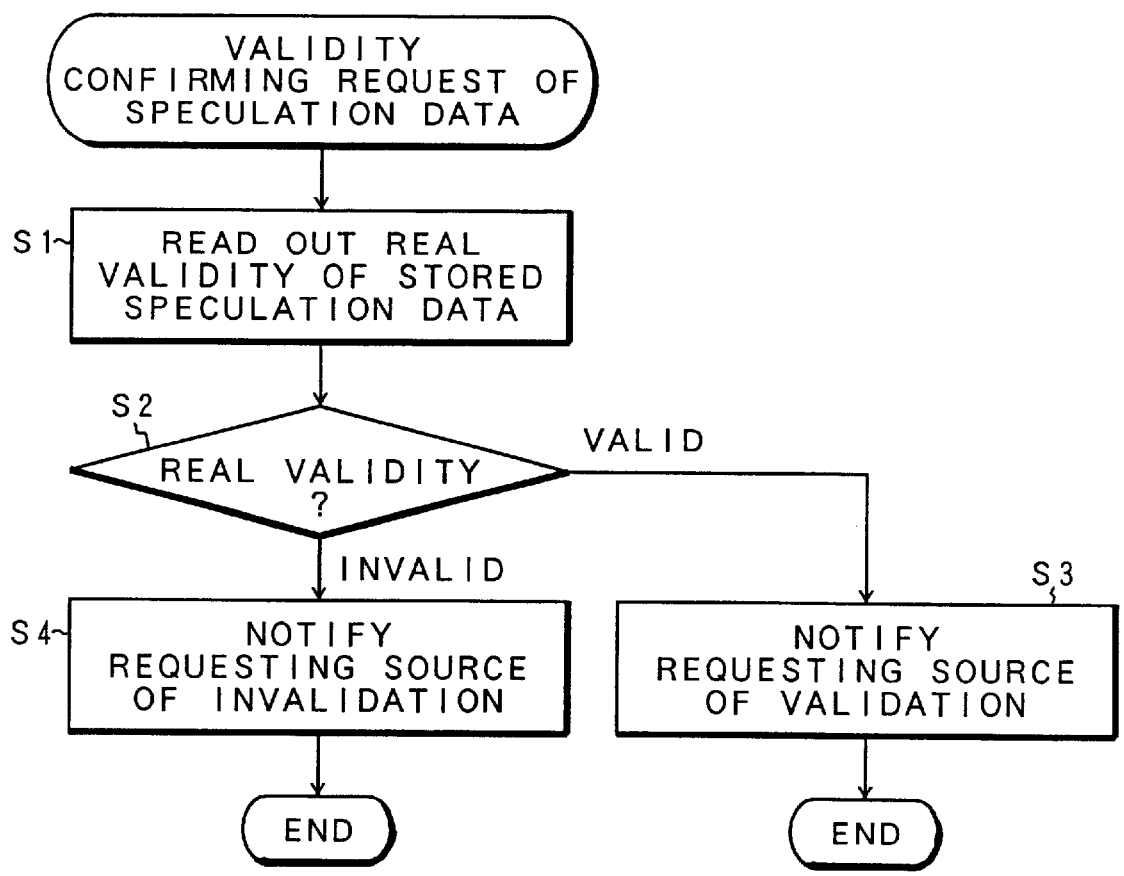
FIG. 18 is a flowchart for a confirmation requesting process which is executed after the speculation data is provided to the requesting source in FIG. 17.

FIG. 18 is a flowchart in the case where the speculation data is supplied to the requesting source and the real validity of the speculation data is confirmed and, thereafter, the confirming request of the validity of the speculation data is received from the processor in steps S4 to S8 in FIG. 17. When the confirming request of the validity of the speculation data is received from the processor as a requesting source, the confirmation result indicative of the real validity of the speculation data which has already been stored in the cache apparatus 10 is read out in step S1. If the real validity is valid in step S2, the validation is notified to the requesting source in step S3, thereby allowing the processor to acknowledge the execution result of the command based on the speculation data. If it is invalid, the processor 12 as a requesting source is notified of the fact that the speculation data is invalid in step S4, thereby allowing the processor to abandon the execution result of the command based on the speculation data.

FIG. 19 is a flowchart for the third embodiment of the cache management control by the MESIU protocol in FIGS. 8A to 8C. The third embodiment is characterized in that in the case where the data in the Unknown U status is supplied as speculation data in response to the reading request from the processor, the cache apparatus itself confirms the real validity of the speculation data without waiting for the validity confirming request of the speculation data from the processor and notifies the processor as a requesting source of a confirmation result. Therefore, the validity confirming request of the speculation data from the processor becomes unnecessary and the burden on the processor is reduced. In FIG. 19, processes in steps S1 to S4 and steps S11 to S13 are substantially the same as those in steps S1 to S4 and steps S9 to S11 in the second embodiment of FIG. 17. Processes in steps S5 to S7 in the case where it is determined in step S4 that the request is the reading request which permits the providing of the speculation data from the processor are also substantially the same as those in the second embodiment of FIG. 17. After the cache apparatus itself supplied the speculation data to the processor as a requesting source, it accesses to the main storage or the other cache, and confirms the real validity of the speculation data. Subsequently, in step S8, if the real validity of the speculation data is valid, the validation is notified to the processor as a requesting source in step S9, so that the processor as a requesting source acknowledges the execution result of the command based on the speculation data. If the real validity of the speculation data is invalid, the invalidation is likewise notified to the processor as a requesting source in step S10, thereby allowing the processor to abandon the execution result of the command based on the speculation data.

(MESU Protocol and Cache Management Control)

Figure 20A:
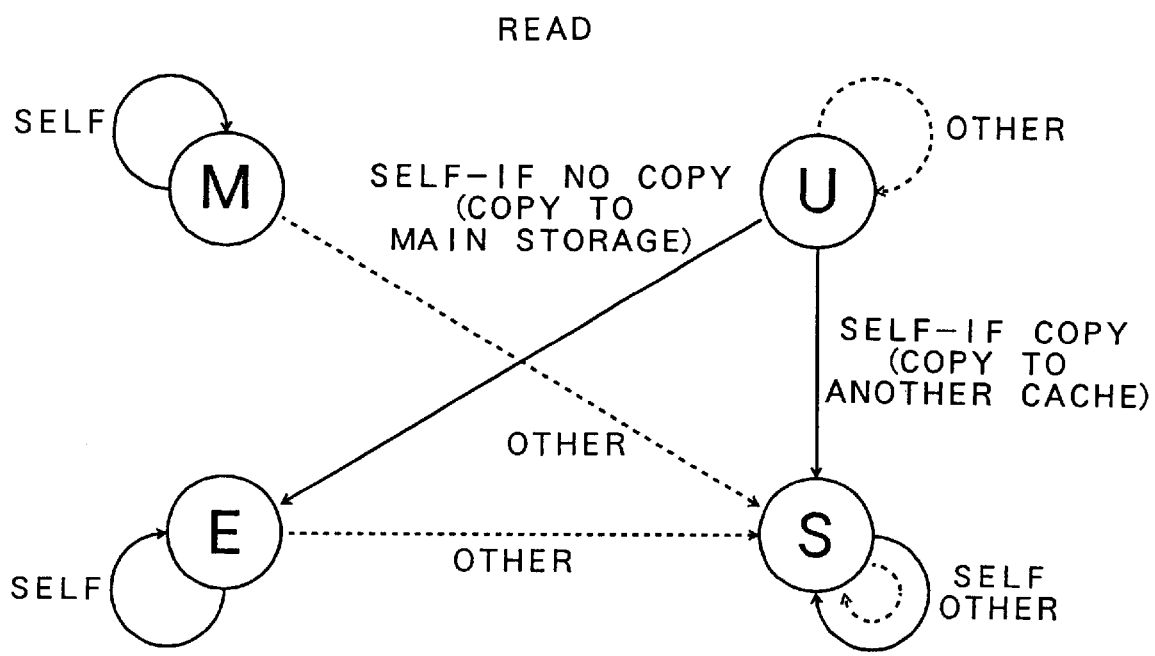
FIGS. 20A to 20C are status transition diagrams of an MESU protocol for realizing the weak invalidating operation and the weak reading operation of the invention in which data held in the cache is handled as data in an Unknown status.
Figure 20B:
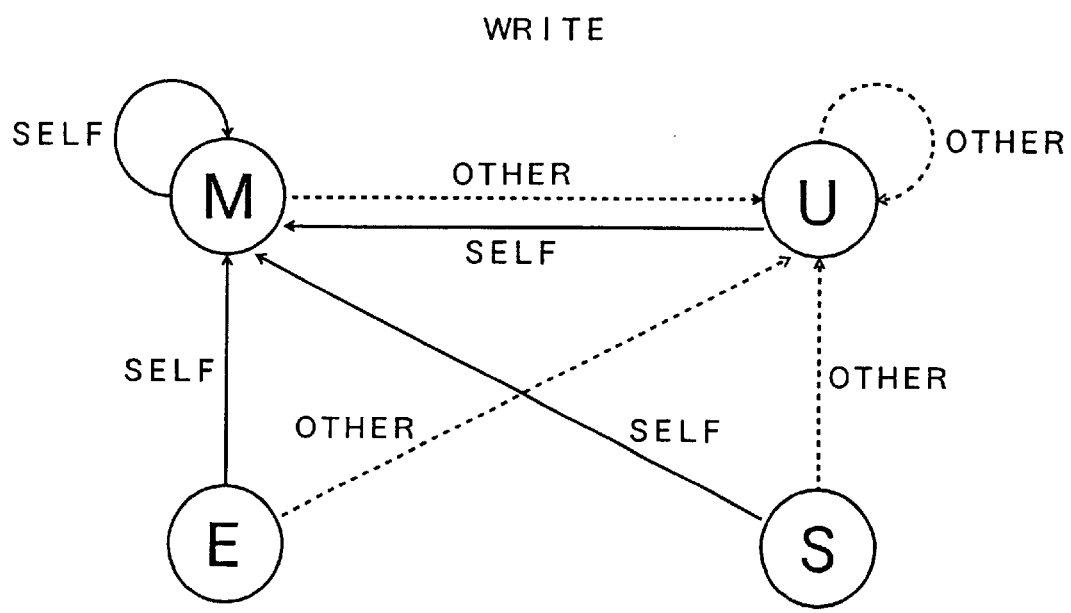
Figure 20C:
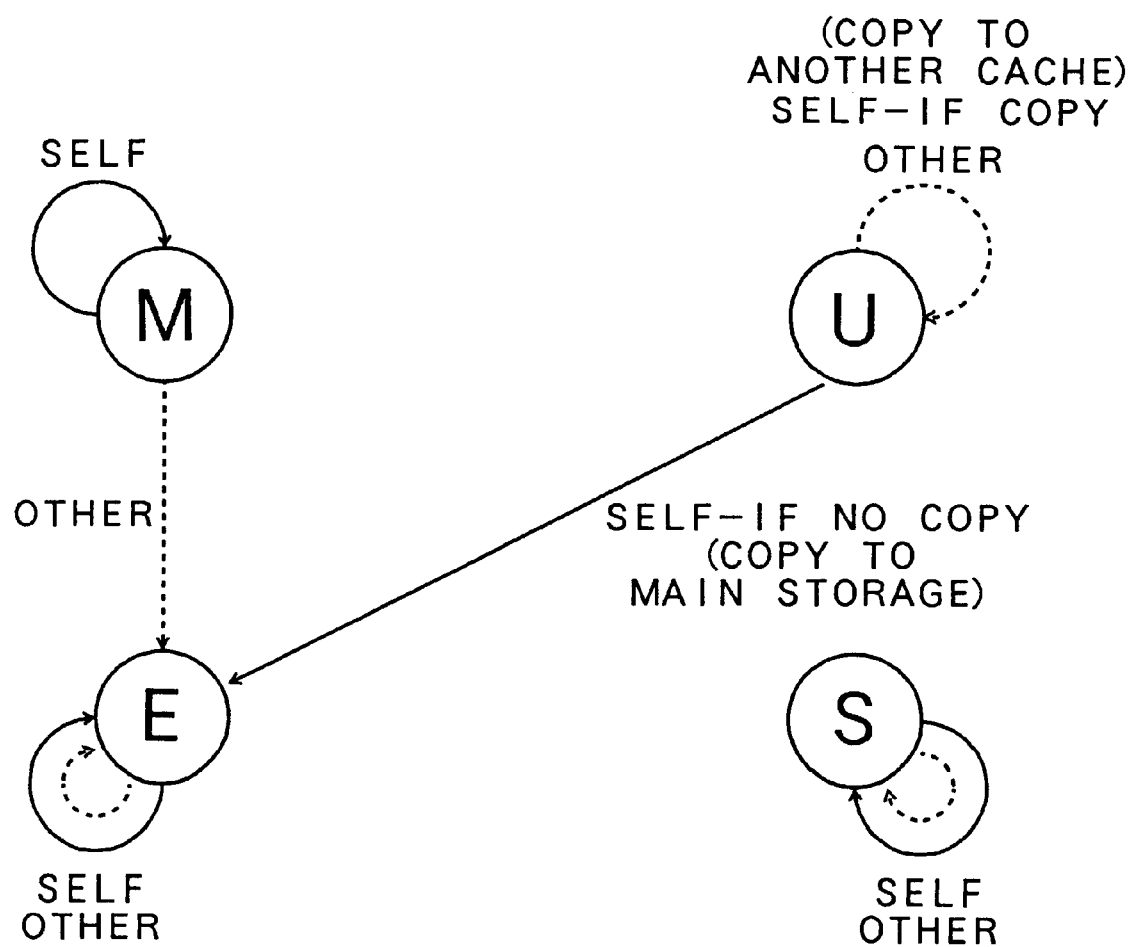

FIGS. 20A to 20C are status transition diagrams of the MESU protocol for realizing the cache management control such that the data whose validity is unknown can be stored in the cache memory which is used in the cache apparatus 10 of the invention of FIG. 7. The MESU protocol is obtained by omitting the Invalid I status from the MESIU protocol in FIGS. 8A to 8C. FIG. 20A shows an MESU reading protocol. FIG. 20B shows an MESU writing protocol. The "weak invalidating operation (weak-invalidate)" according to the invention in FIG. 10 can be similarly realized by the MESU reading protocol and writing protocol in FIGS. 20A and 20B. FIG. 20C shows an MESU weak reading protocol. The same cache management control as the weak reading operation (weak-read) of the invention shown in FIGS. 11A to 11C can be performed by the MESU weak reading protocol. However, in case of the MESU weak reading protocol, it differs with respect to a point that the status of the cache apparatus 10-2 in FIG. 11A is not Invalid I but Unknown U. This point is also similarly applied to the other processing operation of the MESIU weak reading protocol in FIGS. 12A to 12C.

FIG. 21 shows a status transition table of the MESU protocol in FIGS. 20A to 20C. As will be obviously understood by comparing this status transition table with the status transition table of the MESIU protocol in FIG. 9, the contents in the case where the current status is one of Modified M, Exclusive E, and Shared S are the same, the Invalid I status in FIG. 9 is excluded, and with respect to the Unknown U status, the next status is "SELF", and the transition to "E, U" of (2) in the "weak-read" merely differs.

Figure 22:
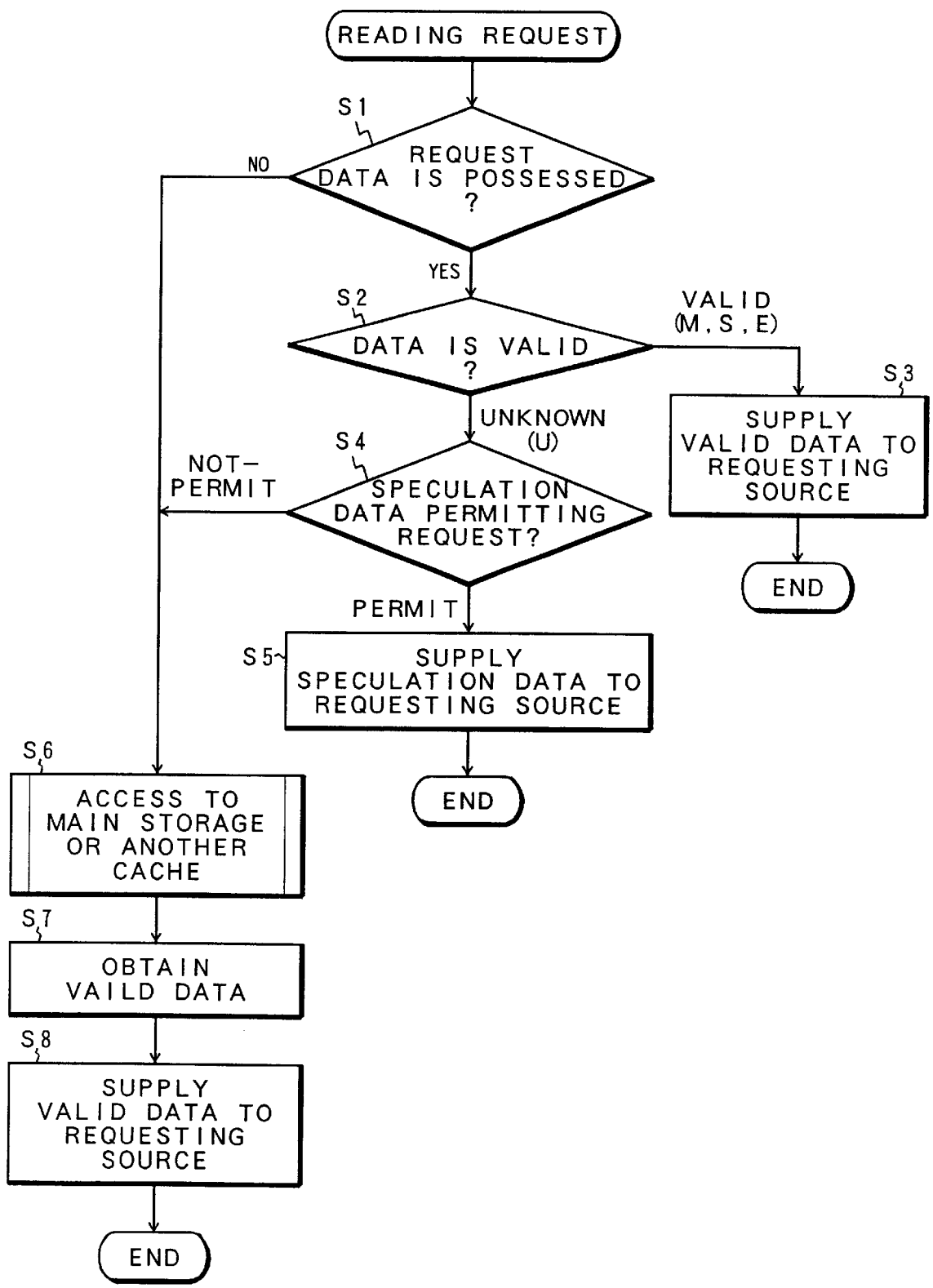
FIG. 22 is a flowchart for the fourth embodiment of the cache management control of the invention according to the cache controller using the MESU protocol in FIGS. 20A to 20C.
Figure 23:
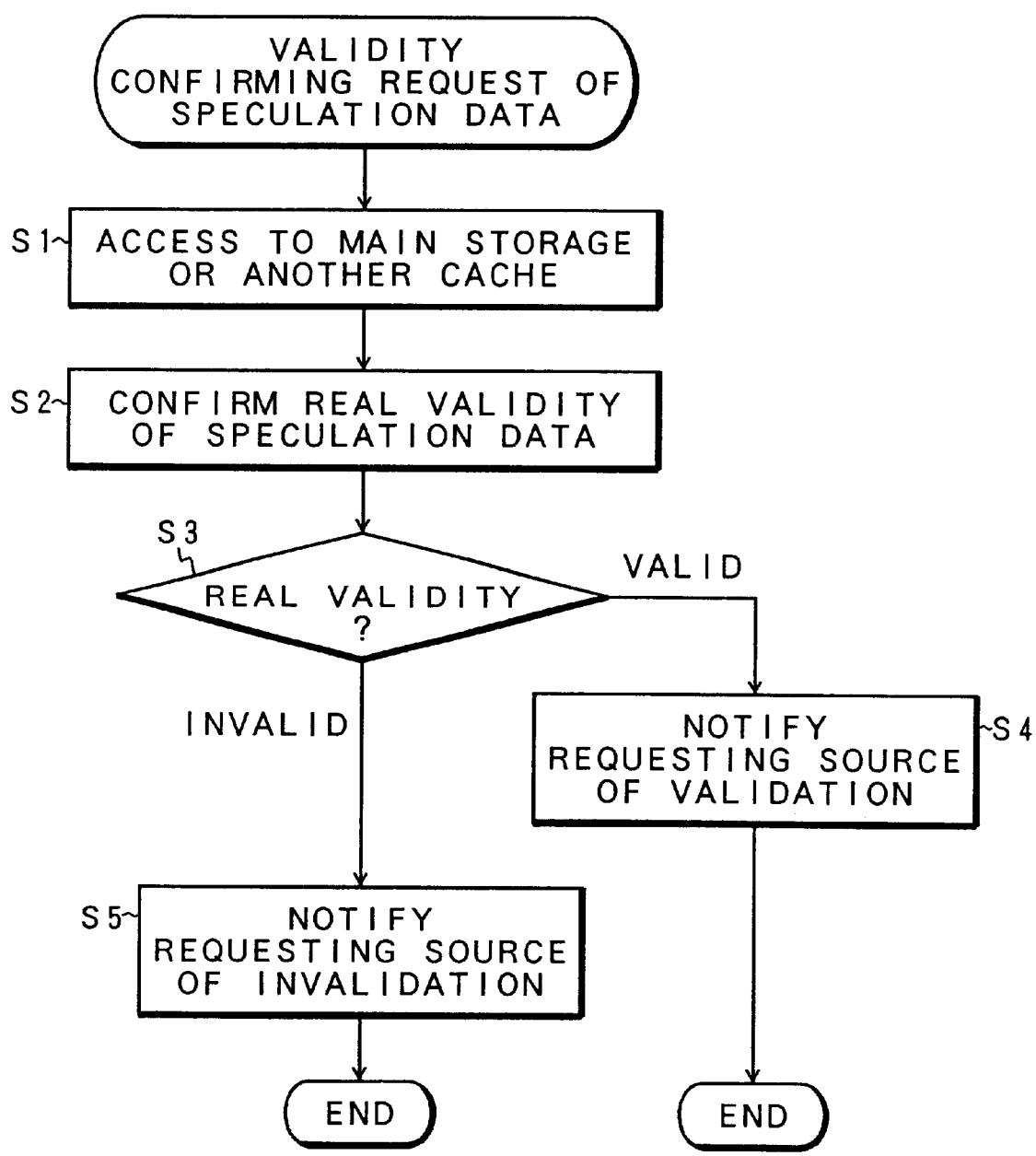
FIG. 23 is a flowchart for a confirmation requesting process which is executed after the speculation data is provided to the requesting source in FIG. 22.

FIG. 22 is a flowchart for the cache management control by the cache apparatus 10 in FIG. 7 using the MESU protocol in FIGS. 20A to 20C and relates to the fourth embodiment of the invention. In the cache management control according to the MESU protocol, when there is a reading request from the processor 12, whether the request data has been possessed or not, namely, whether the data has been held in the cache memory 20 or not is discriminated in step S1. If it is determined that the request data is possessed, the validity of the data is checked in step S2. If the data is in one of the M, S, and E statuses, the data is determined to be valid, and step S3 follows. The valid data is supplied to the processor 12 as a requesting source. If the validity of the data indicates the Unknown U status in step S2, step S4 follows. Whether the request is the reading request which permits to provide the speculation data from the processor or not is discriminated. If it is the reading request which permits to provide the speculation data, the speculation data is supplied to the processor as a requesting source in step S5. After the speculation data was supplied to the processor as a requesting source in step S5, when the validity confirming request of the speculation data is received from the processor, processes in a flowchart of FIG. 23 are executed. The processes for the validity confirming request of the speculation data are substantially the same as those in case of the first embodiment of FIG. 14.

Referring again to FIG. 22, when the request data is not possessed in the cache memory 40 in step S1 or when the request is the reading request which inhibits to provide the speculation data from the processor in step S4, step S6 follows. The main storage 16 or the other cache apparatus is accessed. The valid data is obtained in step S7. The valid data is supplied to the requesting source in step S8. The cache management control as a fourth embodiment of the invention of the MESU protocol in FIG. 22 relates to the processes obtained by excluding the conditional branch of Invalid I in the discrimination result of the validity of the data in step S2 of the MESIU protocol in FIG. 13.

Figure 24:
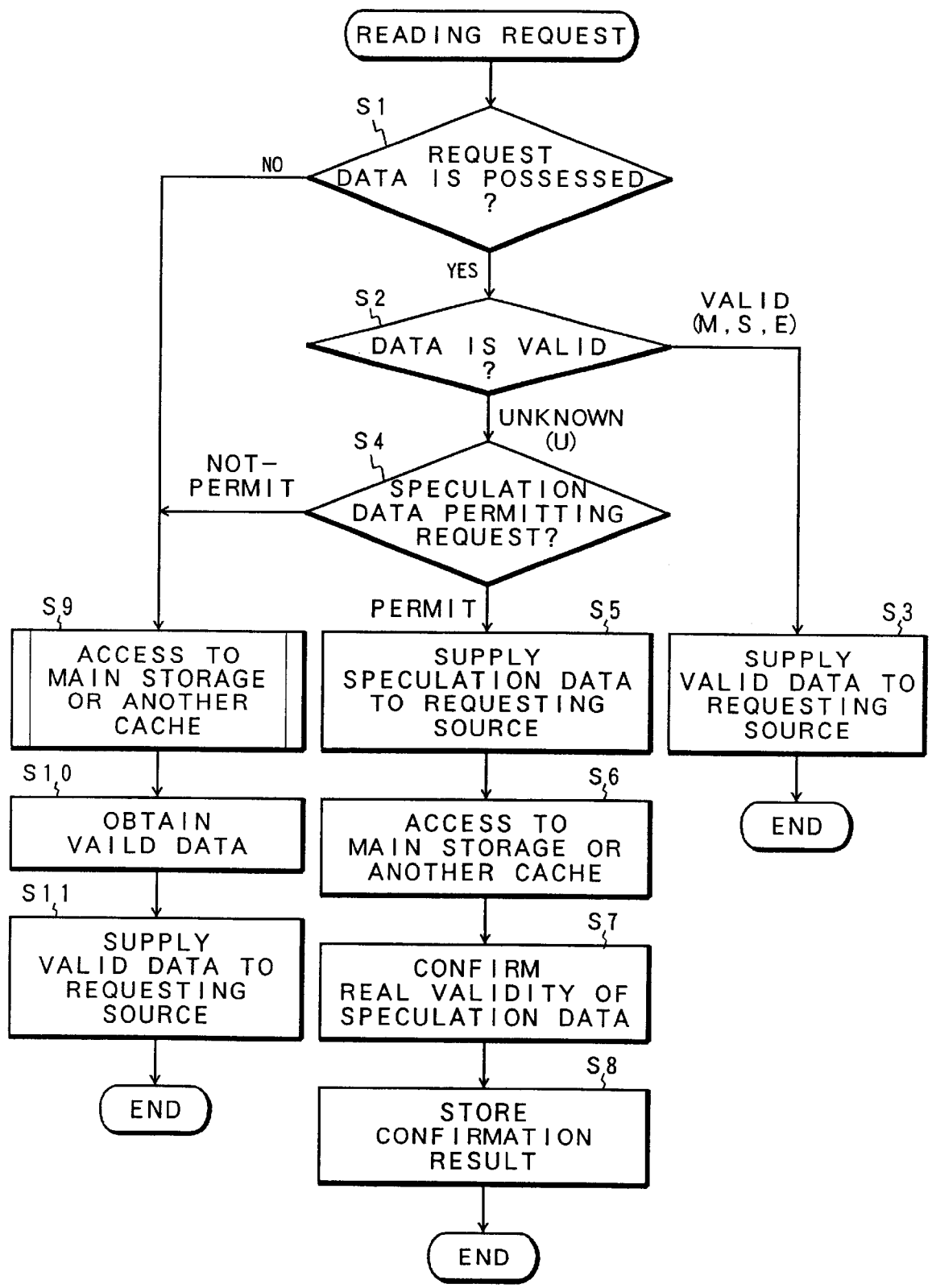
FIG. 24 is a flowchart for the fifth embodiment of the cache management control of the invention according to the cache controller using the MESU protocol in FIGS. 20A to 20C.

FIG. 24 is a flowchart for the fifth embodiment of a cache management control of the invention using the MESU protocol in FIGS. 20A to 20C and characterized in that after the speculation data was supplied to the processor as a requesting source, the cache apparatus 12 itself confirms the validity of the speculation data and stores a confirmation result, and notifies the requesting source of the real validity or invalidation of the speculation data on the basis of the confirmation result stored in the cache apparatus in response to the confirming request of the speculation data validity from the processor as a requesting source after that. The fifth embodiment of FIG. 24 corresponds to substantially the same processes except for the branch process of Invalid I in step S2 in the second embodiment of the cache management control of the MESIU protocol in FIG. 17. As for the storage of the confirmation result of the real validity of the speculation data after the speculation data was supplied in steps S5 to S8, in a manner similar to FIG. 18, the validation or invalidation based on the stored confirmation result is notified in response to the confirming request of the validity of the speculation data from the processor as a requesting source.

FIG. 25 is a flowchart for the sixth embodiment of a cache management control of the invention using the MESU protocol in FIGS. 20A to 20C and characterized in that after the speculation data was supplied to the processor as a requesting source, the cache apparatus 12 itself confirms the real validity of the speculation data and notifies the requesting source of the confirmation result. The processes in FIG. 25 corresponds to substantially the same processes except for the branch process of Invalid I in step S2 in the third embodiment of the cache management control of the MESIU protocol in FIG. 19.

Although the "weak invalidating operation (weak-invalidate)" and the "weak reading operation (weak-read)" of the invention in the above embodiments have been described with respect to the example of the two cache apparatuses for simplicity of explanation, as shown in FIG. 6, the cache management control according to the MESIU protocol in FIGS. 8A to 8C or the MESU protocol in FIGS. 20A to 20C is similarly executed among n arbitrary number of cache apparatuses 10-1 to 10-n connected by the system bus 14. The "weak reading operation (weak-read)" in the embodiments is processed by switching the protocol to the weak reading protocol in FIG. 8C or 20C when the weak reading request which permits to provide the speculation data from the processor is issued. However, the weak reading protocol in FIG. 8C or 20C can be also fixedly set upon activation of the cache controller. This point is also similarly applied to the "weak invalidating operation (weak-invalidate)" and the reading protocol in FIG. 8A or 20A can be also fixedly set upon activation of the cache controller. In all of the above cases, the writing protocol is as shown in FIG. 8B or 20B. Further, the invention is not limited to the foregoing embodiments but incorporates many modifications and variations without losing the objects and advantages of the present invention.

Industrial Applicability

According to the cache apparatus and cache control method of the invention, since the data whose validity is unknown can be held in the cache, the data can be speculatively supplied to the processor and an opportunity that the processor speculatively executes commands increases. Thus, in a part of a case where a cache miss occurs due to the reading request from the processor and it is necessary to possess the data from the main storage or the other cache memory, the execution of the command can be speculatively progressed by the cache hit. Therefore, the invention contributes to shorten the data waiting time of the processor which issued the reading request and can consequently improve the performance of the multiprocessor system.

What is claimed is:

1. Cache apparatuses which are provided for every plurality of processors, mutually connected by a bus, and connected to a main storage by the bus, each comprising:

a cache memory in which a part of data in the main storage is held on a cache line unit basis, and a status of the data held in the cache line is distinguished by three kinds of statuses including Valid, Invalid, and Unknown; and a cache controller processing the data held in the relevant cache line in accordance with the status of Valid, Invalid, or Unknown when a processing request is received from a self processor or another cache apparatus, and, after the processing, changing the status of the holding data in the relevant cache line to a predetermined status determined in order to keep a cache coherence, wherein when a reading request to the cache line holding data whose validity is unknown is issued, said cache controller discriminates whether providing of speculation data to a requesting source is permitted or inhibited, provides the data whose validity is unknown as speculation data to the requesting source when the permission of the providing is determined, and obtaining valid data from the other cache apparatus or said main storage and providing it to the requesting source when the inhibition of the providing is determined.

2. Apparatuses according to claim 1, wherein after the speculation data is provided to the requesting source, when a validity confirming request of the speculation data is issued from the requesting source, said cache controller confirms a real validity of the speculation data and notifies the requesting source of a result of the confirmation.

3. Apparatuses according to claim 1, wherein said cache controller provides the speculation data to the requesting source and, at the same time, confirms a real validity of the speculation data, stores a result of the confirmation, and notifies the requesting source of the stored confirmation result of the validity when a validity confirming request of the speculation data is issued from the requesting source.

4. Apparatuses according to claim 1, wherein said cache controller provides the speculation data to the requesting source and, at the same time, confirms a real validity of the speculation data, and notifies the requesting source of a result of the confirmation.

5. Apparatuses according to claim 1, wherein when the speculation data is determined to be valid from the confirmation result, said cache controller notifies the requesting source of the confirmation result, thereby allowing the requesting source to acknowledge an execution result of a command based on the speculation data, and when the speculation data is determined to be invalid, said cache controller notifies said requesting source of the confirmation result, thereby allowing the requesting source to abandon the execution result of the command based on the speculation data.

6. Apparatuses according to claim 1, wherein when the reading request to the cache line holding the data which has a predetermined specific address and whose validity is unknown in the main storage is issued, said cache controller inhibits providing the data as speculation data to the requesting source, and when the reading request to the cache line holding data which has an address other than the specific address and whose validity is unknown in the main storage, is issued, said cache controller permits providing the data as speculation data to the requesting source.

7. Apparatuses according to claim 1, wherein when a reading request formed by executing a command for inhibiting the speculation data of said processor is received by the cache line holding the data whose validity is unknown, said cache controller inhibits providing the data as speculation data to the requesting source, and when a reading request formed by executing a command for permitting the speculation data of said processor is received by the cache line holding the data whose validity is unknown, said cache controller permits providing the data as speculation data to the requesting source.

8. Cache apparatuses which are provided for every plurality of processors, mutually connected by a bus, and connected to a main storage by the bus, each comprising:
   a cache memory in which a part of data in the main storage is held on a cache line unit basis, and a status of the data held in the cache line is distinguished by three kinds of statuses including Valid, Invalid, and Unknown; and
   a cache controller processing the data held in the relevant cache line in accordance with the status of Valid, Invalid, or Unknown when a processing request is received from a self processor or another cache apparatus, and, after the processing, changing the status of the holding data in the relevant cache line to a predetermined status determined in order to keep a cache coherence, wherein
   said cache controller has an MESIU protocol for distinguishing the status of the holding data in said cache line by five statuses in which a status showing that the validity of the data is unknown is added to an MESI protocol for a cache coherence for distinguishing the status of said holding data by four statuses including Modified indicative of validation, Exclusive, Shared, and Invalid,
   said cache controller performs the following status control on the basis of the MESIU protocol:
   A. in the case where the reading request for the holding data in the cache line is processed,
      I. if there is the reading request from the self processor in the Modified M status, the status is changed to the same Modified M status and if there is the reading request from the other cache apparatus, the status is changed to the Shared S status,
      II. if there is the reading request from the self processor in the Exclusive E status, the status is changed to the same Exclusive E status and if there is the reading request from the other cache apparatus, the status is changed to the Shared S status,
      III. if there is the reading request from the self processor or the reading request from the other cache apparatus in the Shared S status, the status is changed to the same Shared S status,
      IV. if the other cache apparatus does not hold the relevant line due to the reading request from the self processor in the Invalid I status, the status is changed to the Exclusive E status and if the other cache apparatus holds the relevant line, the status is changed to the Shared S status, and further, if there is the reading request from the other cache apparatus, the status is changed to the same Invalid I status, and
      V. if the other cache apparatus does not hold the relevant line due to the reading request from the self processor in the Unknown U status, the status is changed to the Exclusive E status and if the other cache apparatus holds the relevant line, the status is changed to the Shared S status, and further, if there is the reading request from the other cache apparatus, the status is changed to the same Unknown U status; and
   B. in the case where a writing request for the holding data in the cache line is processed,
      I. if there is the writing request from the self processor in the Modified M status, the status is changed to the same Modified M status and if there is the writing request from the other cache apparatus, the status is changed to the Unknown U status,
      II. if there is the writing request from the self processor in the Exclusive E status, the status is changed to the Modified M status and if there is the writing request from the other cache apparatus, the status is changed to the Unknown U status,
      III. if there is the writing request from the self processor in the Shared S status, the status is changed to the Modified M status and if there is the writing request from the other cache apparatus, the status is changed to the Unknown U status,
      IV. if there is the writing request from the self processor in the Invalid I status, the status is changed to the Modified M status and if there is the writing request from the other cache apparatus, the status is changed to the same Invalid I status, and
      V. if there is the writing request from the self processor in the Unknown U status, the status is changed to the Modified M status and if there is the writing request from the other cache apparatus, the status is changed to the same Unknown U status.

9. Apparatuses according to claim 8, wherein in the case where said cache controller processed a weak reading request which permits provision of the speculation data held in the Unknown U status and is issued from said processor, it executes the following status control on the basis of the MESIU protocol in a weak reading mode:
   I. if there is the reading request from the self processor in the Modified M status, the status is changed to the same Modified M status and if there is the reading request from the other cache apparatus, the status is changed to the Exclusive E status,
   II. if there is the reading request from the self processor in the Exclusive E status or the reading request from the other cache apparatus, the status is changed to the same Exclusive E status, III. if there is the reading request from the self processor or the reading request from the other cache apparatus in the Shared S status, the status is changed to the same Shared S status, IV. if the other cache apparatus does not hold the relevant line due to the reading request from the self processor in the Invalid I status, the status is changed to the Exclusive E status and if the other cache apparatus holds the relevant line, the status is changed to the Unknown U status, and further, if there is the reading request from the other cache apparatus, the status is changed to the same Invalid I status, and V. if there is the reading request from the self processor or the reading request from the other cache apparatus in the Unknown U status, the status is changed to the same Unknown U status.

10. Apparatuses according to claim 9, wherein said cache controller fixedly sets a cache management control of the weak-read MESIU protocol.

11. Cache apparatuses which are provided for every plurality of processors, mutually connected by a bus, and connected to a main storage by the bus, each comprising:

a cache memory in which a part of data in the main storage is held on a cache line unit basis, and a status of the data held in the cache line is distinguished by two kinds of statuses including Valid and Unknown; and a cache controller processing the data held in the relevant cache line in accordance with the status of Valid or Unknown when a processing request is received from a self processor or another cache apparatus, and, after the processing, changing the status of the holding data in the relevant cache line to a predetermined status determined in order to keep a cache coherence, wherein said cache controller has an MESU protocol for distinguishing the status of the holding data in the cache line by four statuses in which the status showing that the validity of the data is unknown, is added to an MES protocol for a cache coherence for distinguishing the status of the holding data by three statuses including Modified indicative of validation, Exclusive, and Shared, said cache controller executes the following status control on the basis of said MESU protocol:

A. in the case where a reading request for the holding data in the cache line is processed, I. if there is the reading request from the self processor in the Modified M status, the status is changed to the same Modified M status and if there is the reading request from the other cache apparatus, the status is changed to the Shared S status, II. if there is the reading request from the self processor in the Exclusive E status, the status is changed to the same Exclusive E status and if there is the reading request from the other cache apparatus, the status is changed to the Shared S status, III. if there is the reading request from the self processor or the reading request from the other cache apparatus in the Shared S status, the status is changed to the same Shared S status, and IV. if the other cache apparatus does not hold the relevant line due to the reading request from the self processor in the Unknown U status, the status is changed to the Exclusive E status and if the other cache apparatus holds the relevant line, the status is changed to the Unknown U status, and further, if there is the reading request from the other cache apparatus, the status is changed to the same Unknown U status; and B. in the case where a writing request for the holding data in the cache line is processed, I. if there is the writing request from the self processor in the Modified M status, the status is changed to the same Modified M status and if there is the writing request from the other cache apparatus, the status is changed to the Unknown U status, II. if there is the writing request from the self processor in the Exclusive E status, the status is changed to the Modified M status and if there is the writing request from the other cache apparatus, the status is changed to the Unknown U status, III. if there is the writing request from the self processor in the Shared S status, the status is changed to the Modified M status and if there is the writing request from the other cache apparatus, the status is changed to the Unknown U status, and IV. if there is the writing request from the self processor in the Unknown U status, the status is changed to the Modified M status and if there is the writing request from the other cache apparatus, the status is changed to the same Unknown U status.

12. Apparatuses according to claim 11, wherein when said cache controller processes a weak reading request which permits providing the speculation data which has been held in the Unknown U status and is issued from said processor, it executes the following status control on the basis of an MESU protocol in a weak reading mode:

I. if there is the reading request from the self processor in the Modified M status, the status is changed to the same Modified M status and if there is the reading request from the other cache apparatus, the status is changed to the Exclusive E status, II. if there is the reading request from the self processor or the reading request from the other cache apparatus in the Exclusive E status, the status is changed to the same Exclusive E status, III. if there is the reading request from the self processor or the reading request from the other cache apparatus in the Shared S status, the status is changed to the same Shared S status, and IV. if the other cache apparatus does not hold the relevant line due to the reading request from the self processor in the Unknown U status, the status is changed to the Exclusive E status and if the other cache apparatus holds the relevant line or there is the reading request from the other cache apparatus, the status is changed to the same Unknown U status.

13. Apparatuses according to claim 12, wherein said cache controller fixedly sets a cache management control of the weak-read MESU protocol.

14. A cache control method for cache apparatuses which are provided for every plurality of processors and are mutually connected by a bus and connected to a main storage by the bus, comprising:

holding a part of data in the main storage in a cache memory on a cache line unit basis and distinguishing a status of the data held in the cache line by three kinds of statuses including Valid, Invalid, and Unknown;

processing the data held in the relevant cache line in accordance with the status of Valid, Invalid, or Unknown when a processing request is received from a self processor or another cache apparatus; and changing the status of the holding data in the relevant cache line to a predetermined status in order to keep a cache coherence after the processing of the request, wherein when a reading request to the cache line holding data whose validity is unknown, is issued, whether provision of speculation data to a requesting source is permitted or inhibited is discriminated, the data whose validity is unknown is provided as speculation data to the requesting source when the permission of the providing source is determined, and valid data is obtained from the other cache apparatus or the main storage and provided to the requesting source when the inhibition of the providing is determined.

15. A method according to claim 14, wherein after the speculation data is provided to the requesting source, when a validity confirming request of the speculation data is issued from the requesting source, a real validity of the speculation data is confirmed and a result of the confirmation is notified to the requesting source.

16. A method according to claim 14, wherein the speculation data is provided to the requesting source and, at the same time, a real validity of the speculation data is confirmed, a result of the confirmation is stored, and the stored confirmation result of the validity is notified to the requesting source when a validity confirming request of the speculation data is issued from the requesting source.

17. A method according to claim 14, wherein the speculation data is provided to the requesting source and, at the same time, a real validity of the speculation data is confirmed, and a result of the confirmation is notified to the requesting source.

18. A method according to claim 14, wherein when the speculation data is determined to be valid from the confirmation result, the confirmation result is notified to the requesting source, thereby allowing the requesting source to acknowledge an execution result of a command based on the speculation data, and when the speculation data is determined to be invalid, the confirmation result is notified to the requesting source, thereby allowing the requesting source to abandon the execution result of the command based on the speculation data.

19. A method according to claim 14, wherein when the reading request to the cache line holding the data which has a predetermined specific address and whose validity is unknown in the main storage is issued, it is inhibited to provide the data as speculation data to the requesting source, and when the reading request to the cache line holding data which has an address other than the specific address and whose validity is unknown in the main storage is issued, it is permitted to provide the data as speculation data to the requesting source.

20. A method according to claim 14, wherein when a reading request formed by executing a command for inhibiting the speculation data of said processor is received at the cache line holding the data whose validity is unknown, it is inhibited to provide the data as speculation data to the requesting source, and when a reading request formed by executing a command for permitting the speculation data of said processor, is received at the cache line holding the data whose validity is unknown, it is permitted to provide the data as speculation data to the requesting source.

21. A cache control method for cache apparatuses which are provided for every plurality of processors and are mutually connected by a bus and connected to a main storage by the bus, comprising:

holding a part of data in the main storage in a cache memory on a cache line unit basis and distinguishing a status of the data held in the cache line by three kinds of statuses including Valid, Invalid, and Unknown;

processing the data held in the relevant cache line in accordance with the status of Valid, Invalid, or Unknown when a processing request is received from a self processor or another cache apparatus; and changing the status of the holding data in the relevant cache line to a predetermined status in order to keep a cache coherence after the processing of the request, wherein the status of the holding data in the cache line is controlled on the basis of an MESIU protocol for distinguishing the status of said holding data by five statuses in which a status showing that the validity of the data is unknown is added to an MESI protocol for a cache coherence for distinguishing the status of said holding data by four statuses of Modified indicative of validation, Exclusive, Shared, and Invalid;

the control based on said MESIU protocol is performed in the following manner:

A. in the case where a reading request for the holding data in said cache line is processed, I. if there is the reading request from the self processor in the Modified M status, the status is changed to the same Modified M status and if there is the reading request from the other cache apparatus, the status is changed to the Shared S status, II. if there is the reading request from the self processor in the Exclusive E status, the status is changed to the same Exclusive E status and if there is the reading request from the other cache apparatus, the status is changed to the Shared S status, III. if there is the reading request from the self processor or the reading request from the other cache apparatus in the Shared S status, the status is changed to the same Shared S status, IV. if the other cache apparatus does not hold the relevant data due to the reading request from the self processor in the Invalid I status, the status is changed to the Exclusive E status and if the other cache apparatus holds the relevant data, the status is changed to the Shared S status, and further, if there is the reading request from the other cache apparatus, the status is changed to the same Invalid I status, and V. if the data is copied from said main storage by the reading request from the self processor in the Unknown U status, the status is changed to the Exclusive E status and if the other cache apparatus holds the relevant line, the status is changed to the Shared S status, and further, if there is the reading request from the other cache apparatus, the status is changed to the same Unknown U status; and B. in the case where a writing request for the holding data in the cache line is processed, I. if there is the writing request from the self processor in the Modified M status, the status is changed to the same Modified M status and if there is the writing request from the other cache apparatus, the status is changed to the Unknown U status, II. if there is the writing request from the self processor in the Exclusive E status, the status is changed to the Modified M status and if there is the writing request from the other cache apparatus, the status is changed to the Unknown U status, III. if there is the writing request from the self processor in the Shared S status, the status is changed to the Modified M status and if there is the writing request from the other cache apparatus, the status is changed to the Unknown U status, IV. if there is the writing request from the self processor in the Invalid I status, the status is changed to the Modified M status and if there is the writing request from the other cache apparatus, the status is changed to the same Invalid I status, and V. if there is the writing request from the self processor in the Unknown U status, the status is changed to the Modified M status and if there is the writing request from the other cache apparatus, the status is changed to the same Unknown U status.

22. A method according to claim 21, wherein when a weak reading request which permits provision of the speculation data held in the Unknown U status in a cache line and which is issued from the processor, is processed, a control based on a weak-read MESIU protocol is executed in the following manner:

I. if there is the reading request from the self processor in the Modified M status, the status is changed to the same Modified M status and if there is the weak reading request from the other cache apparatus, the status is changed to the Exclusive E status, II. if there is the reading request from the self processor in the Exclusive E status or the reading request from the other cache apparatus, the status is changed to the same Exclusive E status, III. if there is the reading request from the self processor or the reading request from the other cache apparatus in the Shared S status, the status is changed to the same Shared S status, IV. if the other cache apparatus does not hold the relevant data due to the reading request from the self processor in the Invalid I status, the status is changed to the Exclusive E status and if the other cache apparatus holds the relevant data, the status is changed to the Unknown U status, and further, if there is the reading request from the other cache apparatus, the status is changed to the same Invalid I status, and V. if there is the reading request from the self processor or the reading request from the other cache apparatus in the Unknown U status, the status is changed to the same Unknown U status.

23. A method according to claim 22, wherein a cache management control of the weak-read MESIU protocol is fixedly set.

24. A cache control method whereby cache apparatuses provided for every plurality of processors are mutually connected by a bus and connected to a main storage by the bus, comprising:

holding a part of data in the main storage in a cache memory on a cache line unit basis and distinguishing a status of the data held in the cache line by two kinds of statuses including Valid and Unknown;

when a processing request is received from a self processor or another cache including apparatus, processing the data held in the relevant cache line in accordance with the status of Valid or Unknown; and changing the status of the holding data in the relevant cache line to a predetermined status in order to keep a cache coherence after the processing of said request, wherein a control is performed on the basis of an MESU protocol for distinguishing the status of the holding data in the cache line by four statuses in which the status showing that the validity of the data is the unknown, is added to an MES protocol for a cache coherence for distinguishing the status of the holding data by three statuses of Modified indicative of validation, Exclusive, and Shared, a control based on the MESU protocol is executed in the following manner:

A. in the case where a reading request for the holding data in the cache line is processed, I. if there is the reading request from the self processor in the Modified M status, the status is changed to the same Modified M status and if there is the reading request from the other cache apparatus, the status is changed to the Shared S status, II. if there is the reading request from the self processor in the Exclusive E status, the status is changed to the same Exclusive E status and if there is the reading request from the other cache apparatus, the status is changed to the Shared S status, III. if there is the reading request from the self processor or the reading request from the other cache apparatus in the Shared S status, the status is changed to the same Shared S status, and IV. if the other cache apparatus does not hold the relevant data due to the reading request from the self processor in the Unknown U status, the status is changed to the Exclusive E status and if the other cache apparatus holds the relevant data, the status is changed to the Shared S status, and further, if there is the reading request from the other cache apparatus, the status is changed to the same Unknown U status; and B. in the case where a writing request for the holding data in the cache line is processed, I. if there is the writing request from the self processor in the Modified M status, the status is changed to the same Modified M status and if there is the writing request from the other cache apparatus, the status is changed to the Unknown U status, II. if there is the writing request from the self processor in the Exclusive E status, the status is changed to the Modified M status and if there is the writing request from the other cache apparatus, the status is changed to the Unknown U status, III. if there is the writing request from the self processor in the Shared S status, the status is changed to the Modified M status and if there is the writing request from the other cache apparatus, the status is changed to the Unknown U status, and IV. if there is the writing request from the self processor in the Unknown U status, the status is changed to the Modified M status and if there is the writing request from the other cache apparatus, the status is changed to the same Unknown U status.

25. A method according to claim 24, wherein when a weak reading request which permits provision of the speculation data which has been held in the Unknown U status in the cache line and which is issued from said processor is processed, a control based on a weak-read MESU protocol is executed in the following manner:

I. if there is the reading request from the self processor in the Modified M status, the status is changed to the same Modified M status and if there is the reading request from the other cache apparatus, the status is changed to the Exclusive E status, II. if there is the reading request from the self processor or the reading request from the other cache apparatus in the Exclusive E status, the status is changed to the same Exclusive E status, III. if there is the reading request from the self processor or the reading request from the other cache apparatus in the Shared S status, the status is changed to the same Shared S status, and IV. if the other cache apparatus does not hold the relevant line due to the reading request from the self processor in the Unknown U status, the status is changed to the Exclusive E status and if the other cache apparatus holds the relevant line or there is the reading request from the other cache apparatus, the status is changed to the same Unknown U status.

26. A method according to claim 25, wherein a cache management control of the weak-read MESU protocol, is fixedly set.

* * * * *